(12) United States Patent
Tong et al.

(10) Patent No.: US 11,525,909 B2
(45) Date of Patent: Dec. 13, 2022

(54) TIME / ANGLE OF ARRIVAL MEASUREMENT USING NARROWBAND SIGNALS

(71) Applicant: SAMSUNG ELECTRONICS CO., LTD., Suwon-si (KR)

(72) Inventors: Fei Tong, Bassingbourn (GB); Jacob Christopher Sharpe, Cambridge (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 593 days.

(21) Appl. No.: 16/690,857

(22) Filed: Nov. 21, 2019

(65) Prior Publication Data

US 2020/0166631 A1 May 28, 2020

(30) Foreign Application Priority Data

Nov. 28, 2018 (KR) .......................... 10-2018-0150090

(51) Int. Cl.
*G01S 13/76* (2006.01)
*G01S 7/295* (2006.01)

(52) U.S. Cl.
CPC ............ *G01S 13/762* (2013.01); *G01S 7/295* (2013.01); *G01S 13/765* (2013.01)

(58) Field of Classification Search
CPC ................................. G01S 13/762; G01S 7/295
See application file for complete search history.

(56) References Cited

U.S. PATENT DOCUMENTS

| | | | |
|---|---|---|---|
| 6,331,837 B1 * | 12/2001 | Shattil | ................... H04B 7/086 |
| | | | 342/383 |
| 7,139,581 B2 | 11/2006 | Berliner et al. | |
| 7,634,012 B2 | 12/2009 | Farhang-Boroujeny et al. | |
| 8,478,294 B2 | 7/2013 | Levin et al. | |
| 8,526,391 B2 | 9/2013 | Issakov et al. | |
| 9,813,867 B2 | 11/2017 | Prevatt | |
| 9,915,724 B2 | 3/2018 | Amizur et al. | |
| 9,933,509 B2 | 4/2018 | Hill et al. | |
| 10,056,993 B2 | 8/2018 | Clancy et al. | |
| 10,057,798 B2 | 8/2018 | Jarvis et al. | |
| 2018/0295470 A1 | 10/2018 | Markhovsky et al. | |
| 2018/0299531 A1 | 10/2018 | Hiscock et al. | |

FOREIGN PATENT DOCUMENTS

DE          102019132072 A1 *   5/2020   .......... G01S 13/762

* cited by examiner

*Primary Examiner* — Erin F Heard
*Assistant Examiner* — Helena H Seraydaryan
(74) *Attorney, Agent, or Firm* — F. Chau & Associates, LLC

(57) ABSTRACT

A measurement method performed at a receiving device involves sequentially receiving RF signals, each comprising a different set of at least first and second tones at differing frequencies. Complex gain responses (CGRs) for each of the first and second tones of each of the RF signals are measured. A phase offset is determined between: i) a phase of the CGR of the second tone of a first RF signal, and ii) a phase of the CGR of the first tone of a second RF signal. A coherent channel frequency (CCF) response of the second tone of the second RF signal is computed by adjusting a phase of the CGR of the second tone of the first RF signal by the phase offset. A processor executes a signal paths calculation algorithm using the CCF response of the second tone of the second RF signal to determine an angle or time of arrival of the first RF signal.

20 Claims, 17 Drawing Sheets

SOUNDING SIGNAL : 101010···101010

$$S_{+f}(t) = \alpha(\cos(w_B t) + j\sin(w_B t))$$
$$S_{-f}(t) = \alpha(\cos(w_B t) - j\sin(w_B t))$$
$$\Delta\Phi(t) = \angle S_{+f}(t) - \angle S_{-f}(t)$$

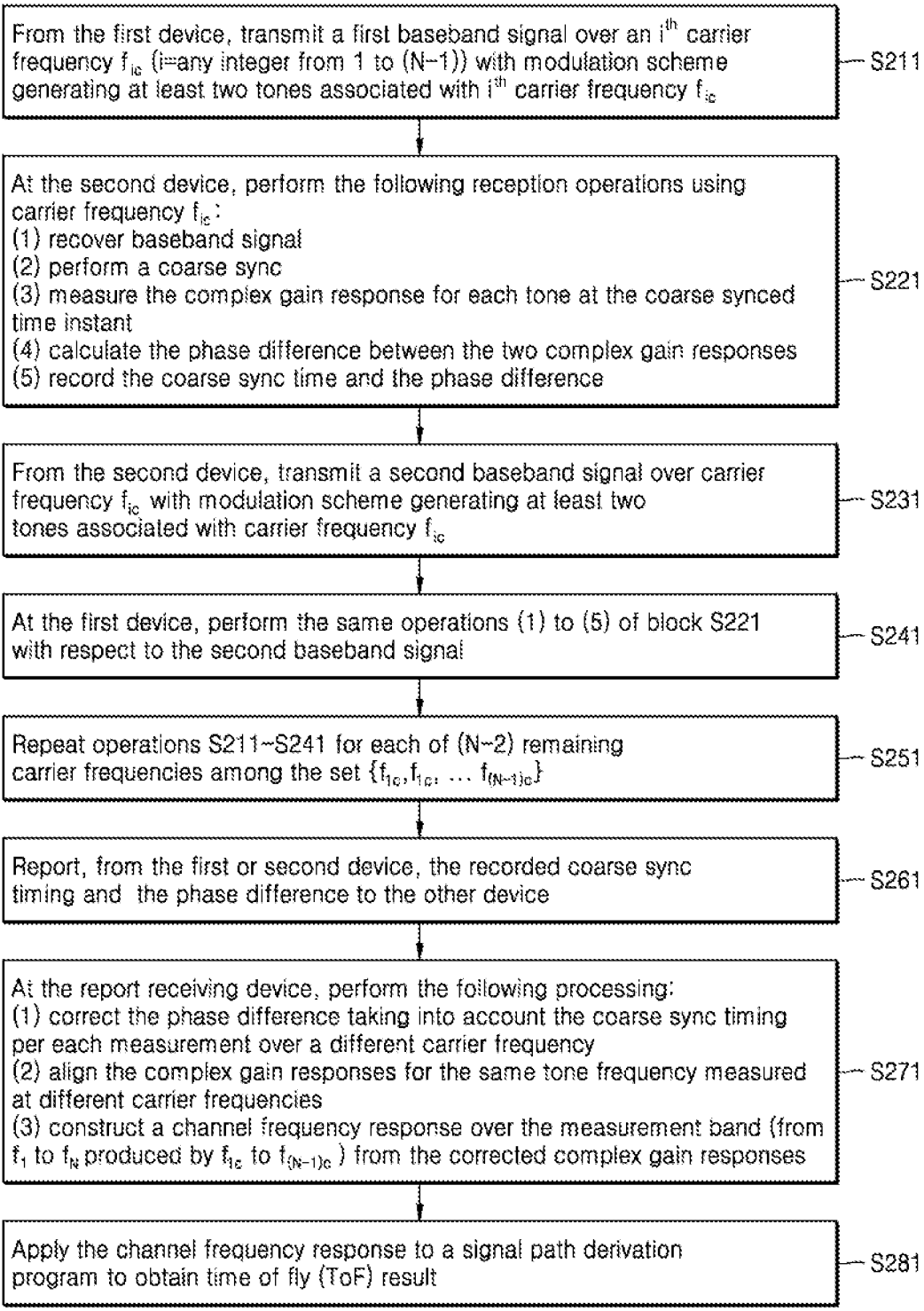

TIME / ANGLE OF ARRIVAL MEASUREMENT USING NARROWBAND SIGNALS

CROSS REFERENCE TO RELATED APPLICATION

The present application claims priority to Korean Patent Application No. 10-2018-0150090 filed on Nov. 28, 2018 in the Korean Intellectual Property Office, the disclosure of which is incorporated by reference herein in its entirety.

TECHNICAL FIELD

The present disclosure relates generally to time of arrival (ToA), angle of arrival (AoA) and ranging measurements between wireless devices.

DISCUSSION OF THE RELATED ART

Distance ("ranging") measurements between two wireless devices may be made by measuring a round trip time (RTT) for signal propagation between the two devices. A ranging measurement may therefore involve measuring time of departure (ToD) and time of arrival (ToA) of sounding signals (test signals) at each device and exchanging the ToA/ToD data. The ToA may be estimated by measuring phase of the sounding signal (after downconversion to baseband) at a time following an initiation sequence. In a multi-path environment, however, the phase measured at any given frequency may be altered by constructive and destructive interference of multi-path signals with the line-of-sight signal, yielding an inaccurate distance measurement.

A current approach to remove such multi-path interference from the phase measurement is to generate a wideband sounding signal with many simultaneous frequencies. One example is a fine timing measurement defined by the IEEE 802.11 standard, which defines a technique to achieve ranging using an orthogonal frequency-division multiplexing (OFDM) signal in the physical layer (PHY). The OFDM signal is used to perform coherent measurements simultaneously at many frequencies to obtain the frequency response (magnitude and phase) of the propagation channel. Then a signal path calculation such as the multiple signal classification (MUSIC) algorithm is used to process the channel frequency responses to estimate the time of arrival with high resolution. In another approach, a direct spread spectrum signal (DSSS) is used to measure the channel impulse response, which is used to estimate the ToA based on the LoS path in a multi-path environment. Then, the ToD and ToA measured at both devices are used to achieve RTT based ranging. The DSSS signal has a wide signal bandwidth and provides capability to resolve multi-path. Each of these wideband approaches, however, requires wideband radio hardware which is costly, complex and consumes high power.

An alternative scheme involves the use of narrowband radio to perform ranging measurements based on radio frequency (RF) phase, since the RF phase is a function of propagation delay. This method relies on specific hardware maintaining continuous RF phase between multiple measurements, which is difficult to achieve.

SUMMARY

In an embodiment of the inventive concept, a measurement method performed at a receiving device involves sequentially receiving a plurality of radio frequency (RF) signals, each comprising a different set of at least first and second tones at differing frequencies. Complex gain responses (CGRs) for each of the first and second tones of each of the plurality of RF signals are measured. A phase offset is determined between: i) a phase of the CGR of the second tone of a first RF signal of the plurality of RF signals, and ii) a phase of the CGR of the first tone of a second RF signal. A coherent channel frequency (CCF) response of the second tone of the second RF signal is computed by adjusting a phase of the CGR of the second tone of the first RF signal by the phase offset. A processor executes a signal paths calculation algorithm using the CCF response of the second tone of the second RF signal to determine an angle of arrival or a time of arrival of the first RF signal in a multi-path environment.

In various options:

Each of the plurality of RF signals may be a Gaussian Frequency Shift Keying (GFSK) signal generated using a different carrier frequency. Each GFSK signal may be initiated with a data signal of a predetermined duration, composed of alternating 1's and 0's.

Examples of the signal paths calculation algorithm include the MUltiple Signal Classification (MUSIC) algorithm, the Estimation of Signal Parameters via Signal Rotational Techniques (ESPRIT) algorithm, and the Pisarenko Harmonic Decomposition (PHD) algorithm.

The CGRs of the first and second tones of a given RF signal of the plurality of RF signals may be measured by: downconverting the given RF signal to a baseband signal; sampling the baseband signal to obtain a sequence of samples; performing a Fourier transform based processing operation (e.g. DFT or FFT) on the sequence of samples, that determines amplitude and phase of a spectral component of the baseband signal at each of a positive offset frequency and a negative offset frequency relative to a reference baseband frequency; where the CGR of the first tone of the given RF signal equals the amplitude and phase at the negative offset frequency and the CGR of the second tone of the given RF signal corresponds to the determined amplitude and phase at the positive offset frequency. The given RF signal may be a GFSK signal generated using a carrier frequency modulated to generate the first and second tones of the given RF signal at frequencies offset from the carrier frequency by the negative offset frequency and the positive offset frequency, respectively.

In another embodiment, a wireless device includes: an antenna that sequentially receives a plurality of RF signals, each comprising a different set of at least first and second tones at differing frequencies; and processing circuitry configured to execute instructions analogous to those of the measurement method delineated above.

In yet another embodiment, a non-transitory computer-readable recording medium stores instructions that, when executed by at least one processor, implements the above-delineated measurement method.

In still another embodiment, a distance measurement system includes first and second wireless devices. The first wireless device includes transmitting circuitry configured to sequentially transmit a plurality of RF signals, each including a different set of at least first and second tones at differing frequencies. The second wireless device includes: an antenna that sequentially receives the plurality of RF signals; processing circuitry configured to execute instructions for: measuring complex gain responses (CGRs) for each of the first and second tones of each of the plurality of RF signals; determining a phase offset between a phase of the CGR of the second tone of a first RF signal of the plurality of RF signals, and a phase of the CGR of the first tone of a second RF signal of the plurality of RF signals; computing a coherent channel frequency (CCF) response of the second tone of the second RF signal by adjusting a phase of the CGR of the second tone of the first RF signal by the phase offset; executing a signal paths calculation algorithm using the CCF response of the second tone of the second RF signal to determine a time of arrival of the first RF signal in a multi-path environment; and transmitting a reporting message to the first wireless device including the determined time of arrival of the given RF signal and a time of departure of another RF signal from the second wireless device, where the first wireless device measures a time of arrival of the latter RF signal, which is used in determining distance between the first and second wireless devices.

BRIEF DESCRIPTION OF THE DRAWINGS

The above and other aspects and features of the inventive concept will become more apparent from the following detailed description, taken in conjunction with the accompanying drawings in which like reference characters indicate like elements or features. Various elements of the same or similar type may be distinguished by annexing the reference label directly with a second label or with a dash and second label that distinguishes among the same/similar elements (e.g., −1, −2). However, if a given description uses only the first reference label, it is applicable to any one of the same/similar elements having the same first reference label irrespective of the second reference label.

FIG. 14 is a flow chart illustrating another embodiment of a ranging method in accordance with the inventive concept.

DETAILED DESCRIPTION OF EMBODIMENTS

The following description, with reference to the accompanying drawings, is provided to assist in a comprehensive understanding of certain exemplary embodiments of the inventive concept disclosed herein for illustrative purposes. The description includes various specific details to assist a person of ordinary skill in the art with understanding the inventive concept, but these details are to be regarded as merely illustrative. For the purposes of simplicity and clarity, descriptions of well-known functions and constructions may be omitted when their inclusion may obscure appreciation of the inventive concept by a person of ordinary skill in the art.

Embodiments of the inventive concept described hereafter use a narrowband signal on multiple carrier frequencies to measure time of arrival or direction of arrival. The process involves multiple measurements, where each measurement uses a narrowband sounding signal (e.g. a few MHz wide) that contains at least two tones generated through modulation of a single RF carrier. For each measurement, a phase difference between the at least two tones received by a receiving device is determined at a certain time point following an initiation sequence. A pair of measurements uses different carrier frequencies, but there is at least one tone positioned at the same (absolute) frequency as a tone in another measurement, so as to establish phase coherence between all measurements. The use of multiple pairs of such measurements extends the measurement bandwidth sufficiently wide to provide multi-path resolution, yielding accurate AoA/ToA measurements.

Embodiments of the inventive concept can use narrowband signal/radio to perform ranging or AoA (interchangeably, Direction of Arrival (DoA) that achieves similar performance in a multi-path channel condition that traditionally is only achieved by wideband ranging technique (e.g., 40 MHz or wider). Compared to the wideband ranging techniques, the inventive concept allows for the use of narrowband radio, which is inexpensive to build and consumes less power to operate. The narrowband signal can also achieve longer link coverage compared to a wideband signal with the same total transmit power. Existing radio, such as Bluetooth radio, can be reused for the narrowband ranging application of the inventive concept.

Herein, the term wireless device refers to any device capable of transmitting and/or receiving a wireless signal. A wireless device may be a portable device, a handheld device, a fixed location device, a base station, etc., and may be configured for operation over any protocol, such as Bluetooth, WiFi, LTE, 5G, and so forth.

Figure 1:
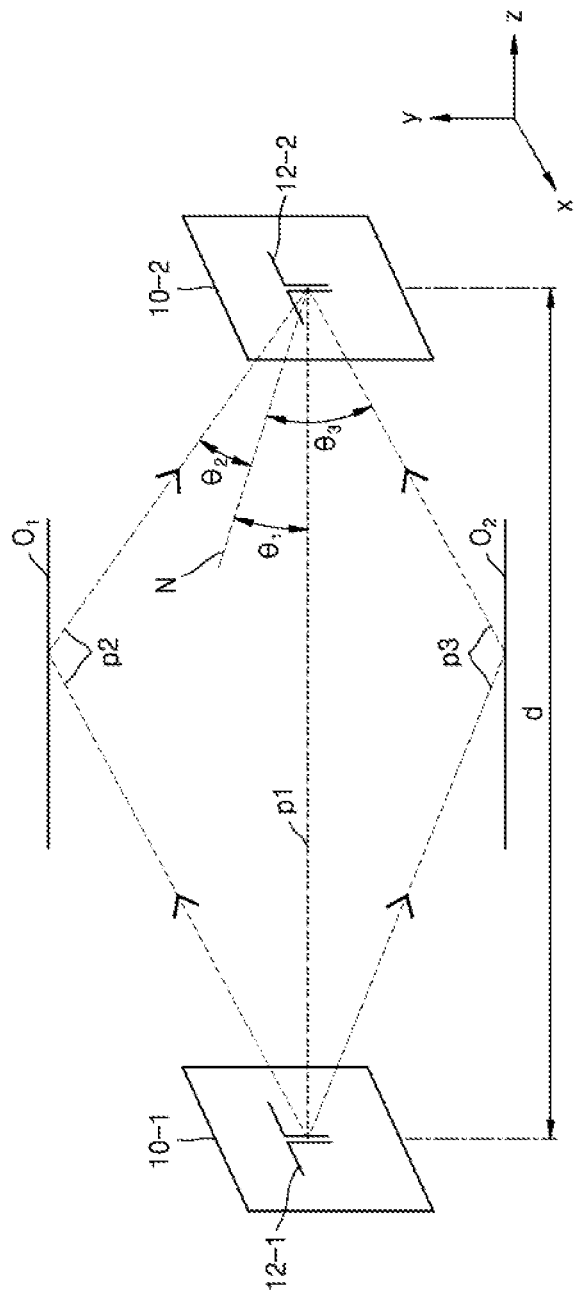
FIG. 1 illustrates a communication system including wireless devices in a multi-path environment.

FIG. 1 illustrates a communication system including wireless devices in a multi-path environment. A first wireless device 10-1 includes an antenna 12-1 that transmits a signal to a second wireless device 10-2 with an antenna 12-2. A line-of-sight path p1 carries a line-of-sight signal incident upon the aperture of antenna 12-2 at an angle θ1 with respect to a normal N of antenna 12-2. (Each of antennas 12-1 and 12-2 may be embodied as a single antenna element or an array of elements.) Signal energy transmitted by antenna 12-1 is also reflected by objects $O_1$ and $O_2$ in the communication environment and received by antenna 12-2 along multi-path channel paths p2 and p3 incident at angles θ2 and θ3, respectively. A line-of-sight distance d may be determined using a feedback scheme in which each wireless device 10-1 and 10-2 measures a time of departure (ToD) of a first sounding signal transmitted from the respective device and a time of arrival (ToA) of a second sounding signal transmitted from the other device. In embodiments described hereafter, the ToA involves a measurement of both a coarse ToA and a fine ToA, where the fine ToA is based on a phase measurement of a recovered baseband signal. On the transmit side, the baseband signal had modulated a carrier to generate the sounding signal. However, due to the multi-path, the phase of the recovered baseband signal may be nonlinear as a function of RF frequency. Consequently, the measured phase of a sounding signal generated through modulation of any given carrier may not properly reflect the line-of-sight distance. However, ToA measurements using phase coherence, as described below, may be used to effectively correct this phase error and produce a more accurate distance measurement.

As mentioned earlier, in a related art wideband measurement method, a wideband signal composed of carriers (e.g. at frequencies $f_1$ to $f_N$) distributed across a wide band (e.g. 40 MHz or more), carrying baseband signals (e.g., BB-1 to BB-n, respectively), is transmitted from a transmitting device. The receiving device receives and downconverts the wideband signal to recover the baseband signals, and obtains channel frequency responses (e.g., denoted as $H(f_1)$ to $H(f_N)$) corresponding to measured amplitudes and phases of the baseband signals. The channel frequency responses are applied as inputs to a signal path calculation algorithm (e.g., MUSIC). The algorithm calculates AoAs/ToAs of signal paths from the transmitting device to the receiving device, and/or signal path distances, using $H(f_1)$ to $H(f_N)$. As noted above, however, the generation of such a wideband signal requires costly wideband hardware and is power-intensive. An embodiment of the inventive concept described below may measure a set of such coherent channel frequency responses using low cost/simpler to implement narrow band hardware.

Figure 2:
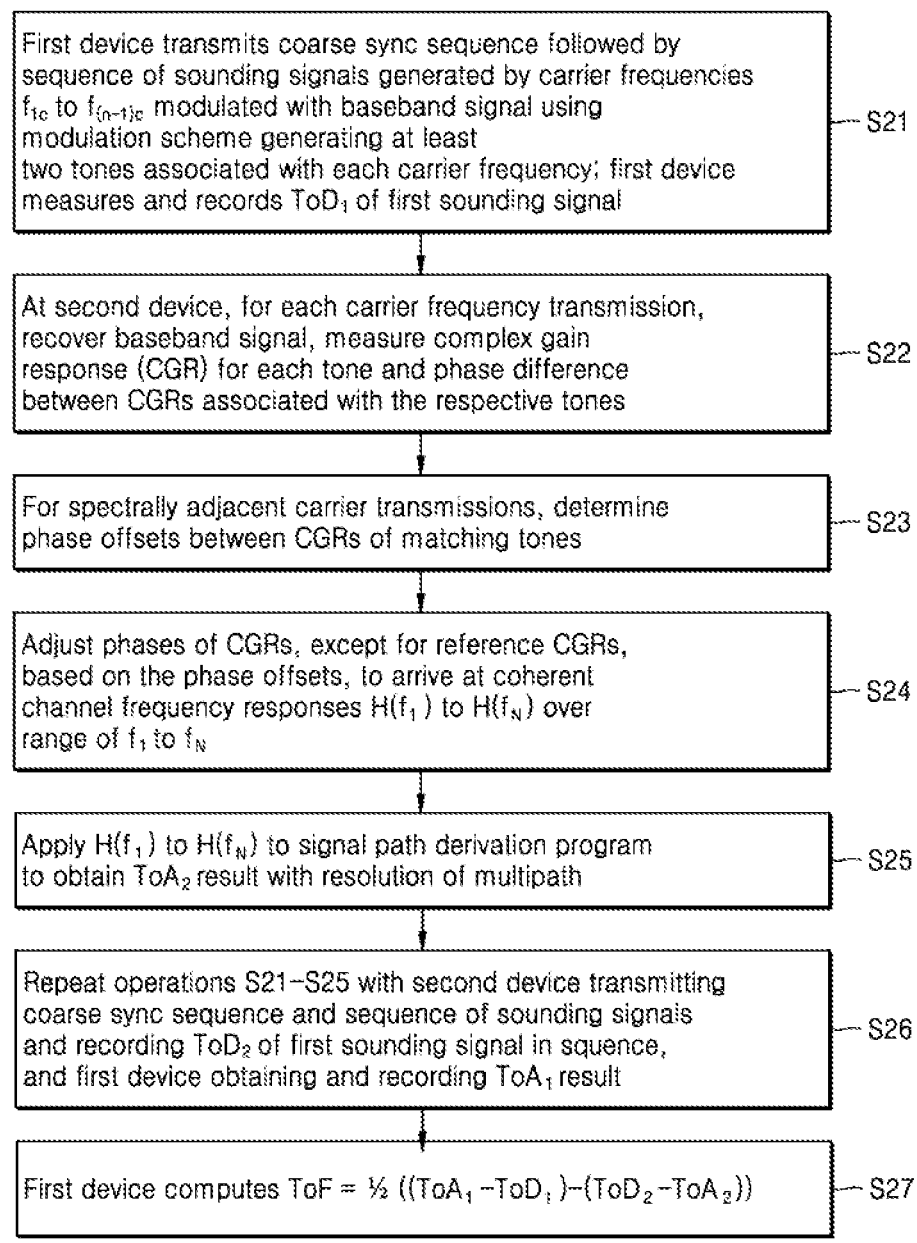
FIG. 2 is a flow chart of a narrowband method for ToA/ranging measurement according to an embodiment.
Figure 3A:
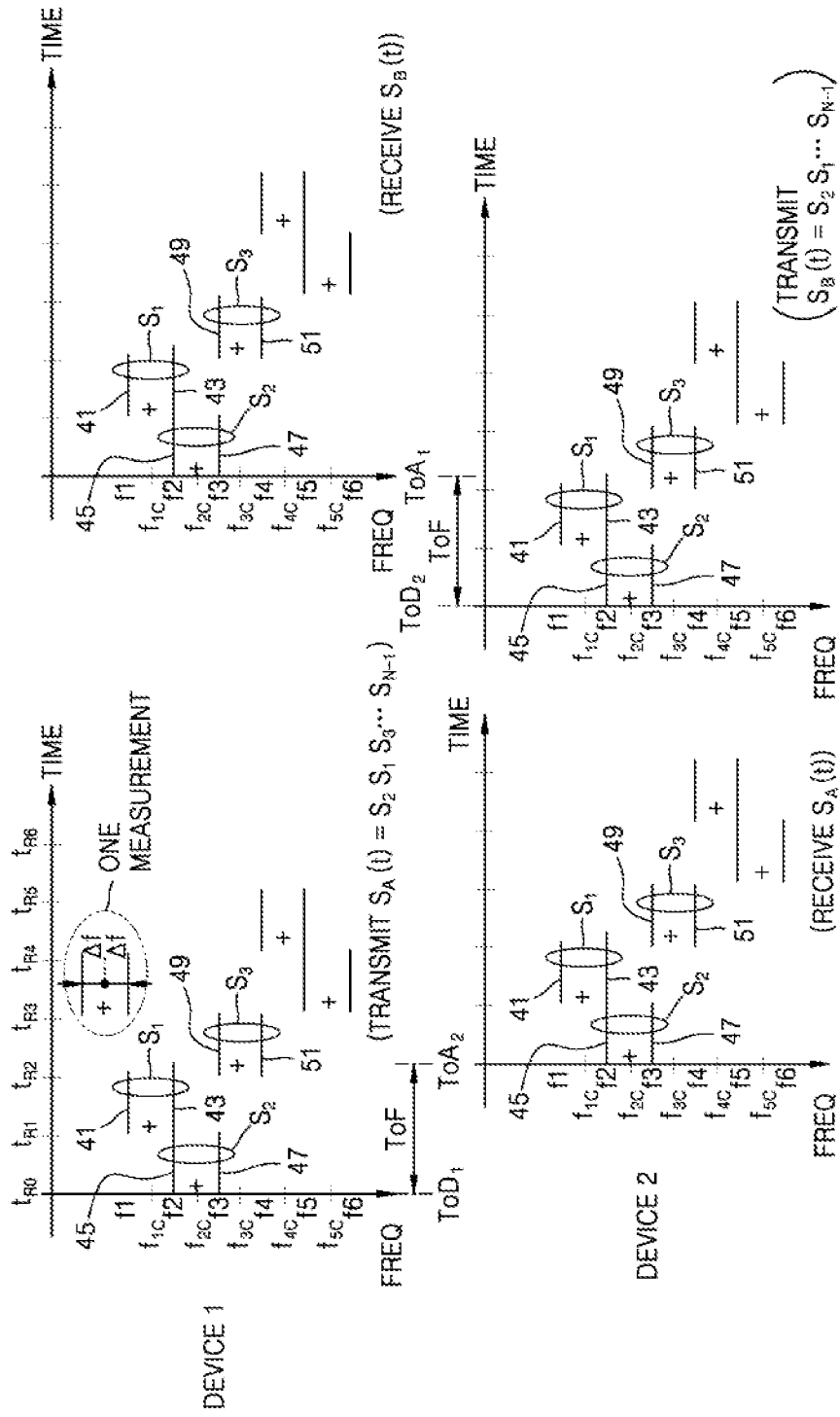
FIG. 3A depicts an example sequence of multi-tone signals generated using different carrier frequencies sequentially generated over a measurement band in the measurement method of FIG. 2.
Figure 3B:
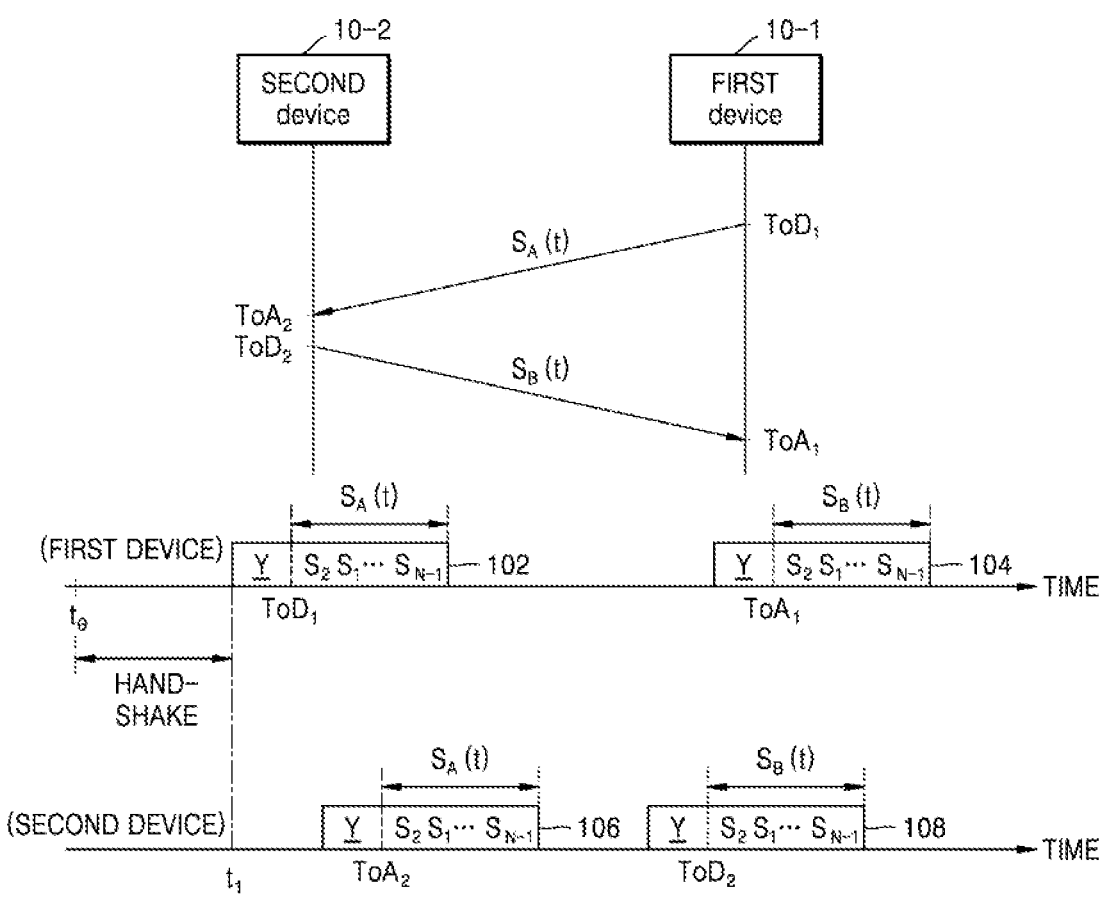
FIG. 3B is a signal flow diagram illustrating exemplary timing of signals exchanged between devices in the method of FIG. 2.

FIG. 2 is a flow chart of a narrow band method for ToA/ranging measurement according to an embodiment. FIG. 3A depicts an example sequence of multi-tone signals generated using different carrier frequencies sequentially generated over a measurement band in the measurement method of FIG. 2. FIG. 3B is a signal flow diagram illustrating exemplary timing of signals exchanged between devices in the method of FIG. 2. Referring collectively to FIGS. 2, 3A and 3B, in the method, a first wireless device 10-1 sequentially transmits "N-1" narrowband multi-tone RF signals ("sounding signals") $S_1$ to $S_{N-1}$ using N-1 carrier frequencies ("carriers") $f_{1C}$ to $f_{(N-1)C}$, respectively, although not necessarily in any particular order. In general, "N" is an integer of at least three, but in a typical case N may be at least 20. A narrowband signal may be up to a few MHz wide in a typical case (e.g., a 1 MHz wide Bluetooth channel signal) but the embodiments described herein may be implemented with sounding signals of any suitable frequency range. Each narrowband signal has at least two RF tones, which are generated by modulating the corresponding carrier with a baseband signal, e.g., using a quadrature modulation scheme involving GFSK, FSK or OFDM signals. Further, one of the tones in each narrowband signal has the same frequency as one of tones within a spectrally adjacent narrowband signal.

Accordingly, in operation block S21, the first wireless device 10-1 transmits a coarse synchronization sequence followed by a sequence of sounding signals generated by carrier frequencies $f_{1c}$ to $f_{(N-1)c}$. These carrier frequencies are sequentially modulated at the first wireless device 10-1 with a baseband signal using a modulation scheme generating at least two tones associated with each carrier frequency. The first wireless device 10-1 may measure and record a time of departure, $ToD_1$, of the transmitted first sounding signal of the sequence. For example, as shown in FIG. 3A, a narrowband sounding signal $S_2$ (first sounding signal of the sequence) is transmitted in a first time slot between times $t_{R0}$ and $t_{R1}$ by modulating a second carrier frequency $f_{2C}$. As shown in FIG. 3B, a signal $S_A(t)$ may be a sequence of sounding signals $S_2, S_1, \ldots S_{N-1}$, and is transmitted at the time $ToD_1$ in a frame 102, where the frame 102 also includes a coarse sync field "Y" preceding the signal $S_A(t)$. The frame 102 may be transmitted at a time $t_1$ following a handshaking period after an initial time to. The modulation of signal $S_A(t)$ may use an alternating 1010101 . . . data sequence or the like with GFSK modulation. This generates narrowband sounding signal $S_2$ with at least two tones 45 and 47 at frequencies $f_2$ and $f_3$, respectively, equally spaced above and below the carrier frequency $f_{2C}$ by a frequency offset Δf. In the next time slot between times $t_{R2}$ and $t_{R3}$, another narrowband signal $S_1$ is transmitted by modulating a first carrier $f_{1C}$ the same way to produce a pair of tones 41 and 43 at frequencies $f_1$ and $f_2$, respectively, below and above $f_{1C}$ by the offset Δf (where tone 43 matches tone 45 in frequency). The same operations may be performed for the remaining narrowband signals in the set of signals $S_1$ to $S_{N-1}$. Note that the example of FIGS. 3A and 3B illustrates that the sequential order of the carrier frequencies for the measurements need not be a progressive order from the low end to the high end of the measurement band, or vice versa. In other examples, a sequential order is used in which signal $S_1$ is transmitted in a measurement sequence before signals $S_2, S_3$, etc.

In operation blocks S22-S25, the second wireless device 10-2 may perform receive and processing operations to determine a time of arrival $ToA_2$ (the subscript "2" denoting the second wireless device 10-2) with the resolution of multi-path. Here, "resolution of multi-path" means that errors caused by multi-path signals are minimized, such that the time of arrival result, based on a phase measurement of $S_A(t)$, is close to that attainable with just a line of sight (LoS) signal if multi-path were not present. To this end, the second wireless device 10-2 performs operations (S22) of receiving the sounding signal $S_A(t)$, downconverting it, and recovering the baseband signals from the downconverted signal. Here, each narrowband signal $S_i$ (where i=any integer from 1 to N-1) may be received and downconverted to recover the associated baseband signal, and at least two complex gain responses ("CGRs") associated with the narrowband signal tones of signal $S_i$ are measured. For a signal $S_i$ containing upper and lower tones $f_i$ and $f_{i+1}$ relative to a carrier frequency $f_{iC}$, a complex gain response "$G_i(f_i)$" associated with the lower tone $f_i$ and a complex gain response "$G_i(f_{i+1})$" associated with the upper tone $f_{i+1}$ are measured. The CGR associated with any tone may be understood as a normalized amplitude and phase of a measured baseband complex sinusoid associated with that tone. This CGR may be determined by sampling the downconverted received signal and performing a Fourier transform based processing operation on the samples to compute the amplitude and phase (referenced to an initial timing) of the individual tones. For each narrowband signal $S_i$ received, a phase difference between the complex gain responses of the at least two tones in that narrowband signal is determined and may be used later to establish phase coherence across the measurement band. Specific details on how such a phase difference may be determined are described later in connection with FIGS. 7-9.

When at least two such narrowband signal measurements with overlapping (matching) tones are completed, phase coherence between all tones of the two measurements can be established by "stitching" of the phase measurements for the various narrowband signals. In this process, for spectrally adjacent carrier transmissions, a phase offset between complex gain responses of matching tones is determined (S23). Based on the phase offsets, a phase adjustment may then be made (S24) in complex gain responses, except for predetermined "reference" complex gain responses, to arrive at "coherent channel frequency (CCF) responses" for the two narrowband signals. Applying the same operations for the remainder of the narrowband signals in the set of signals $S_1$ to $S_{N-1}$ yields a set of CCF responses $H(f_1)$ to $H(f_N)$ over a wide band of frequencies $f_1$ to $f_N$, respectively.

In FIGS. 3A-B, for example, when the narrowband signal $S_2$ is received by the second wireless device 10-2 in a receive frame 106, the second wireless device 10-2 may measure CGRs $G_2(f_2)$ and $G_2(f_3)$, the phase offset between them (the subscript "i" of "G," denoting the $i^{th}$ sounding signal $S_i$) and the frequencies "$(f_i)$" and "$(f_{i+1})$" denoting the lower and upper tones carried by that sounding signal $S_i$. When narrowband signal $S_1$ is received, CGRs $G_1(f_1)$ and $G_1(f_2)$ may be measured. Each of the CGRs $G_1(f_1)$ and $G_1(f_2)$ may be designated reference CGRs, so that $H(f_1)=G_1(f_1)$ and $H(f_2)=G_1(f_2)$. A measured phase offset "α2" between CGRs for the matching tones, i.e., $G_2(f_2)$ and $G_1(f_2)$, may be obtained. The CGR $G_2(f_3)$ may then have its measured phase adjusted by α2 to arrive at the coherent channel frequency response $H(f_3)$. In a similar fashion, CGRs corresponding to tones 49 and 51 of a next narrowband signal $S_3$ may be determined.

The CCF responses $H(f_1)$ to $H(f_N)$ may then be applied (S25) to a processor executing a signal path calculation algorithm to obtain $ToA_2$ measurement result with the resolution of multi-path. Some examples of the signal path calculation algorithm include the MUltiple SIgnal Classification (MUSIC) algorithm, the ESPRIT (Estimation of Signal Parameters via Signal Rotational Techniques) algorithm and the PHD (Pisarenko Harmonic Decomposition) algorithm.

In operation S26, the operations S21-S25 are repeated, but with the second wireless device 10-2 transmitting a frame 108 comprising the coarse sync sequence followed by a sequence of sounding signals, $S_B(t)$ (which may be the same signal as $S_A(t)$) and recording a time of departure $ToD_2$ of $S_B(t)$ from the second wireless device 10-2. The first wireless device 10-1 then performs the operations of S22-S25 previously performed by the second wireless device 10-2. Thus, first wireless device 10-1 receives the signal $S_B(t)$ in a receive frame 104 and measures a time of arrival $ToA_1$ of $S_B(t)$ the same was as second wireless device 10-2 measured $ToA_1$. First wireless device 10-1 may then compute (S27) a time of fly (ToF) according to:

$$ToF = \frac{1}{2}((ToA_1 - ToD_1) - (ToD_2 - ToA_2)) \quad \text{eqn. (1)}.$$

It is noted here that in the method of FIG. 2, sampling delay may always be maintained constant between sounding signals over the different RF frequencies. In this way, the measurement result may not take into account any per frequency sync jitter.

The CGR may be measured for each of the tones having the same relative delay (between Tx and Rx samples), assuming that the sampling clocks within wireless devices 10-1 and 10-2 do not drift in frequency and time.

It is also noted that in the measurement method of FIG. 2, each of the first and second wireless devices 10-1 and 10-2 may measure ToD by performing reception of its own transmission and measuring ToD in the reception path. With this technique, the processing delay for measuring $ToA_1$ in the first wireless device 10-1 can be about the same as the processing delay for measuring $ToD_1$, and the processing delay in wireless device 10-2 for measuring $ToA_2$ can be about the same as for measuring $ToD_2$. Thus, the processing delays are removed from the ToF measurement, and any differences in processing delays between the two wireless devices 10-1 and 10-2 is accounted for in the final ToF measurement, yielding a more accurate result.

Accordingly, the method of FIG. 2 transfers multiple narrow bandwidth sounding measurements to a coherent wide bandwidth sounding measurement. In this ranging measurement, certain advantages are realizable as compared to conventional RF ranging. For instance, the frequency step size between successive measurements (e.g., the frequency difference between carriers $f_{1C}$ and $f_{2C}$) does not limit the ranging performance as much as in RF ranging. In conventional RF ranging, the phase dispersion is a function of delay as well as frequency step size; this relationship will dictate that, for a certain range of delay, the frequency step size needs to be in a precise range: small enough to avoid ambiguity and at the same time large enough to be above the phase error. Such restrictions are alleviated/eliminated with the present embodiments.

Processing operations to generate the sequential sounding signals and generate the coherent channel frequency responses $H(f_1)$ to $H(f_N)$ in the method of FIG. 2 may be in accordance with the following:

At least two tones are included in each measurement of a sounding signal having a set of frequencies "Fi" (i=1 to (N−1)), where each set is generated by modulating one carrier frequency. Multiple measurements may be conducted in a sequentially incremental order as follows:

$$\mathcal{F}_1 = \{f_1, f_2\}, \mathcal{F}_2 = \{f_2, f_3\} \ldots \mathcal{F}_k = \{f_k, f_{k+1}\}, \mathcal{F}_{k+1},$$
$$\mathcal{F} = \{f_{k+1}, f_{k+2}\}, \ldots, \mathcal{F}_{N-1} = \{f_{N-1}, f_N\},$$

where $\mathcal{F} = (\mathcal{F}_1$ to $\mathcal{F}_{N-1})$ is the finite set of frequencies on which complex gain responses are measured to obtain ToA. Alternatively, the measurement order for the (N−1) measurements may be scrambled throughout the range of ($\mathcal{F}_1$ to $\mathcal{F}_{N-1}$), as in the example of FIGS. 3A-B.

The following complex gain responses may then be measured:

$$\{G_1(f_1), G_1(f_2)\}, \{G_2(f_2), G_2(f_3)\} \ldots \{G_{N-1}(f_{N-1}), G_{N-1}(f_N)\},$$

where for each measurement set $F_m$, modulation of a carrier $f_{mc}$ generates a lower tone $f_m = f_{mc} - \Delta f$ and an upper tone $f_{m+1} = f_{mc} + \Delta f$; $\Delta f$ is an offset frequency; $G_m(f_{m+1})$ is the CGR of the upper tone $f_{m+1}$ measured in the measurement set $F_m$, and $G_{m+1}(f_{m+1})$ is the GCR of the lower tone $f_{m+1}$ measured in the measurement set $F_{m+1}$.

Post-processing these complex gain responses using the following expressions will provide a set of coherent channel frequency (CCF) responses $H(f_1)$ to $H(f_N)$:

$$H(f_1) = G_1(f_1)$$

$$H(f_2) = G_1(f_2),$$

$$H(f_k) = G_{k-1}(f_k) \cdot \Pi_{m=1}^{k-1} e^{j\alpha_m}, \forall k = [3, N], \quad \text{eqn. (2)}$$

where, $$\alpha_{m+1} = \angle G_m(f_{m+1}) G^*_{m+1}(f_{m+1}); \text{ and}$$

$\forall k = [3, N]$ signifies an applicable range for k of 3 to N.

Thus, $\alpha_{m+1}$, represents a phase offset between the complex gain response $G_m(f_{m+1})$ and the complex conjugate of the complex gain response $G_{m+1}(f_{m+1})$ of a tone $f_{m+1}$, measured in each of adjacent measurement sets $F_m$ and $F_{m+1}$. Thereby, $\alpha_{m+1}$ may be said to represent a phase relationship between $G_m(f_{m+1})$ and $G_{m+1}(f_{m+1})$. $H(f_1)$ and $H(f_2)$ are the coherent channel frequency responses for the first and second tones $f_1$ and $f_2$, respectively, and are designated "reference" CCF responses.

Therefore, it can be understood from eqn. (1) that phase offsets $\alpha_{m+1}$ may be sequentially measured, in a sequence from m=1 to m=(N−1), between a complex gain response and a complex conjugate of a complex gain response of the matching tones of each adjacent set of measurements $F_m$, $F_{m+1}$. The phase offsets are cumulatively applied to the complex gain responses, as evident from the term $\Pi_{m=1}^{k-1} e^{j\alpha_m}$, so that each resulting CCF response is effectively referenced to the reference CCF response. In this manner, phase coherence of the CCF responses is achieved over the entire measurement range from $f_1$ to $f_N$. Note that phase coherence is also based on the phase relationship between the upper and lower tones $f_m$, $f_{m+1}$ of a given measurement set $F_m$, which is explained below in connection with FIG. 7.

Figure 4:
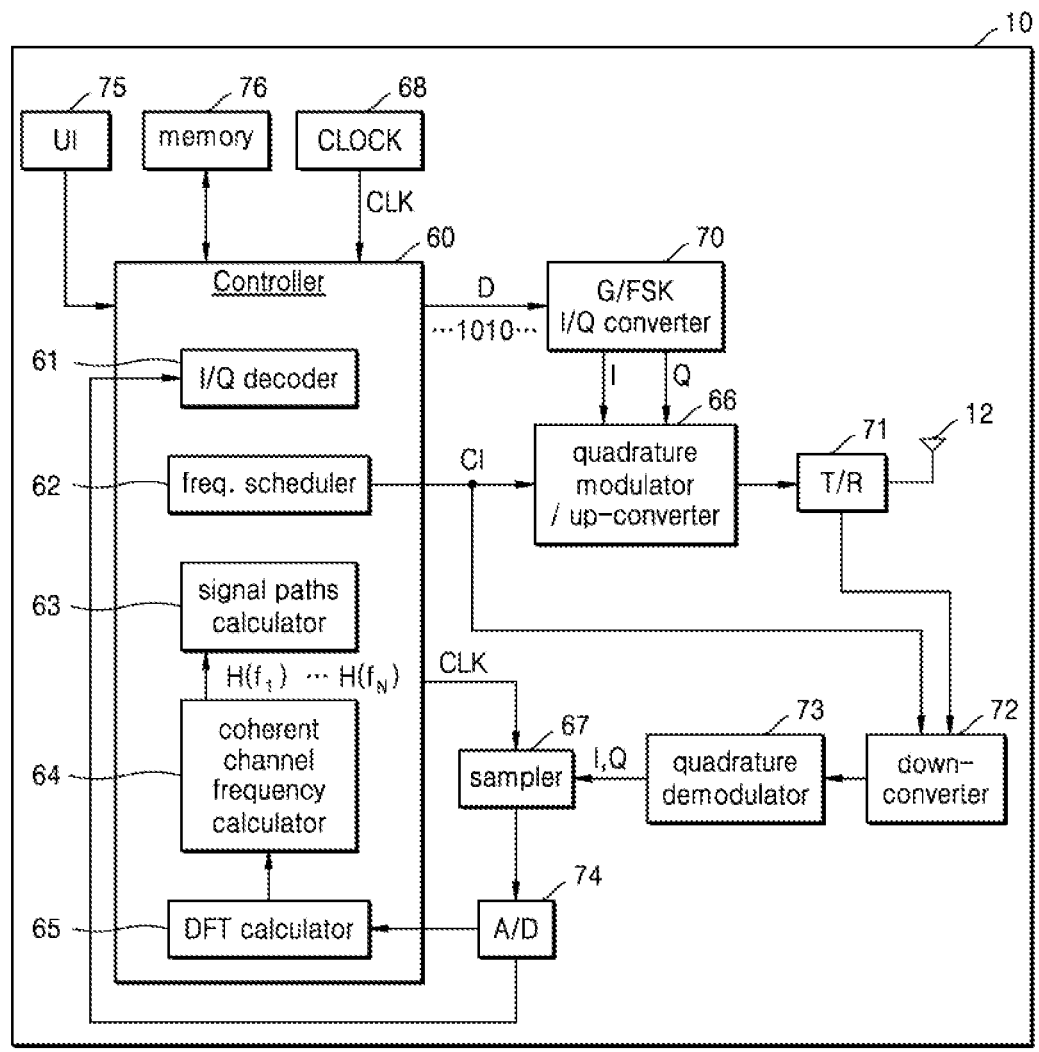
FIG. 4 is a block diagram of a wireless device according to an embodiment.

FIG. 4 is a functional block diagram of a wireless device 10, according to an embodiment, that may be used for either the first or second wireless devices 10-1 or 10-2 of FIG. 1. Wireless device 10 may have a wide range of functionality, but only components relevant to ToA/ranging and/or AoA measurements is illustrated. Wireless device 10 includes a controller 60 that may have processing, logic and control circuitry to control the overall operations of the wireless device 10. A memory 76 may store instructions read by processing circuitry within controller 60 to execute operations described hereafter. Memory 76 may also store interim and final results of various calculations. A clock 68 provides a clock signal CLK to control timing of data symbols, data and control signal frames, and sampling. It is noted that the timing of clock 68 may differ from the timing in the counterpart wireless device (10-1 or 10-2) with which wireless device 10 communicates. Controller 60 may also interact with a user interface (UI) 75 which may receive user inputs to initiate a ranging or AoA operation.

To transmit a narrowband sounding signal using a G/FSK scheme i.e., GFSK or "traditional" FSK without Gaussian or similar filtering between symbol transitions), controller 60 may generate a data pattern D in a sounding signal frame, containing a repetitive pattern of 1's and 0's. The data pattern D may immediately follow a coarse sync sequence which may be an initiation sequence such as a preamble followed by an access code (discussed later). The data pattern D is applied to a G/FSK I/Q converter 70 which converts the data pattern D to G/FSK in-phase (I) and Quadrature (Q) signals. The I and Q signals I and Q are applied to a quadrature modulator/up-converter 66, which converts the same to a multi-tone RF sounding signal through modulation of a carrier by the I and Q signals. The carrier frequency may be controlled by means of a control signal C1 generated by a frequency scheduler 62 of controller 60, thereby setting the tone frequencies in each measurement sequence. The sounding signal may be routed through transmit/receive (T/R) front end circuitry 71 and transmitted to the counterpart wireless device by an antenna 12. (T/R front end circuitry 71 may include, e.g., a transmit path amplifier and band pass filter, a T/R switch, a receive path low noise amplifier (LNA), a receive path band pass filter, and so forth, as known by those skilled in the art.)

Figure 11:
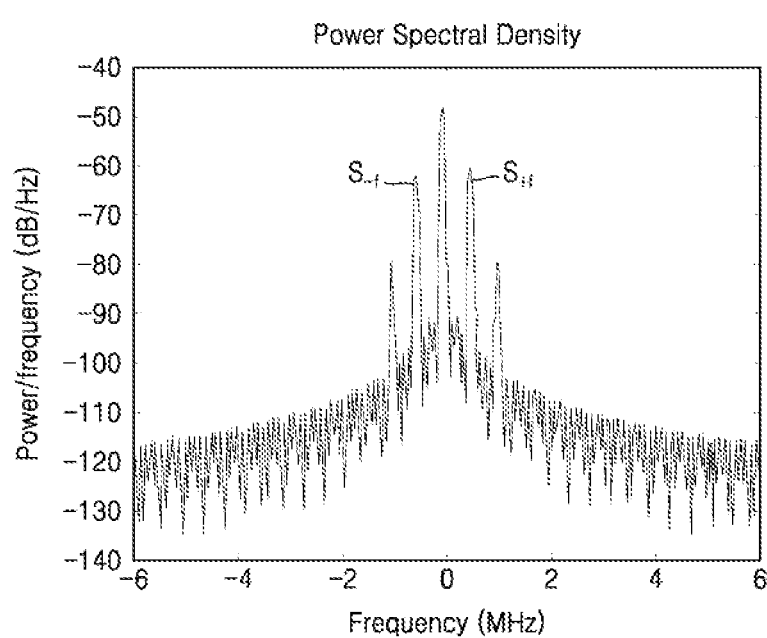
FIG. 11 is a graph of baseband power spectral density computed for a sounding signal portion of the ranging signal of FIG. 10.

In a receive direction, antenna 12 receives a sounding signal transmitted from the counterpart wireless device and routes it through T/R front end circuitry 71 to down-converter 72 where it is down-converted to a baseband signal, e.g., with a spectrum as illustrated in FIG. 11 discussed later. A desired amount of frequency translation in the down-conversion may vary slightly depending on the carrier frequency used on transmit. To this end, down-converter 72 may receive the control signal C1 or other signal from controller 60 and set the frequency of an internal local oscillator accordingly to obtain the desired amount of frequency translation. The down-converted signal may be provided to a quadrature demodulator 73 which recovers the analog I and Q signals. A sampler 67 samples and holds the I and Q signals and outputs the same to an A/D converter 74 where they are converted to digital codes.

When it is desired to decode the I and Q signals to recover the data they represent, the digitized output of A/D converter 74 is decoded by an I/Q decoder 61 within controller 60. For the ToA/ranging measurements, however, decoding of the I and Q signals of the sounding signal is unnecessary. To complete these measurements, the digitized samples generated by A/D converter 74 are output to a discrete Fourier transform (DFT) (or Fast Fourier transform (FFT)) calculator 65 of controller 60, which computes the amplitudes and phases of the main spectral components of the sounding signal, which were translated to baseband frequencies. (This may be done at the frequencies of just the expected two tones for each sounding signal, rather than obtaining a complete set of DFT/FFT frequencies.) The results of DFT calculator 65 may be used to obtain complex gain responses G (each being a normalized amplitude and phase) of each of the tones within the sounding signal. The complex gain responses are then output to a coherent channel frequency calculator 64 which computes a set of coherent channel frequency (CCF) responses $H(f_1)$ to $H(f_N)$ based on eqn. (2) described earlier. The CCF responses are based on at least two measurement sequences at different carrier frequencies.

The CCF responses $H(f_1)$ to $H(f_N)$ are applied to a signal paths calculator 63 that computes ToAs for a distance measurement between wireless device 10 and the counterpart wireless device. To this end, signal paths calculator 63 may include processing circuitry that executes a suitable algorithm such as MUSIC, ESPRIT or PHD.

For example, considering MUSIC, this algorithm can be viewed as a super-resolution inverse FFT, which produces a time domain view of the multi-path. This view is generally known as spectrum against ToA or AoA (not be confused with actual channel impulse response). Conventionally, MUSIC is used to estimate AoA, but it is applicable to both AoA and ToA since they are dual problems (the phase vs. frequency response is a function of delay in the ToA estimation problem, which is equivalent to the phase space response as a function of angle of arrival in the AoA estimation problem).

Figure 5:
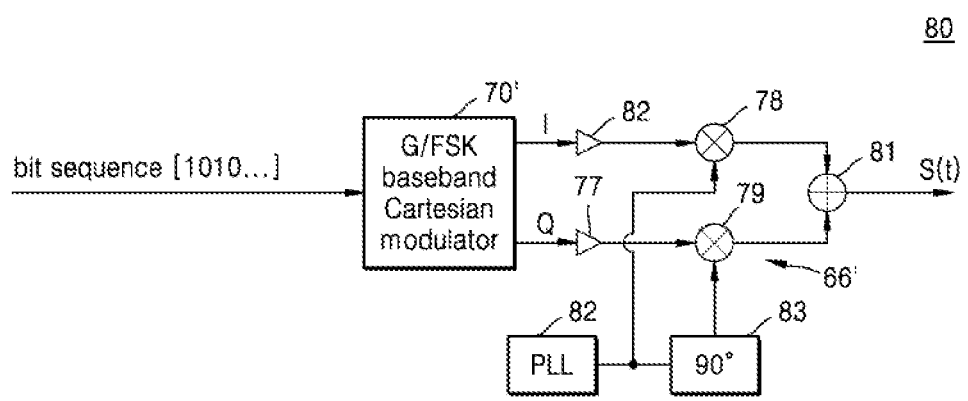
FIG. 5 is a block diagram of an example Cartesian modulator, which may be used for the G/FSK I/Q converter and quadrature modulator/up-converter of FIG. 4.

FIG. 5 is a block diagram of an example Cartesian modulator, which may be used for the G/FSK I/Q converter and quadrature modulator/up-converter of FIG. 4. Cartesian modulator 80 includes a GIFSK baseband Cartesian modulator 70', which converts 1's and 0's data to G/FSK I and Q symbols. The I and Q symbols are output to amplifiers 82 and 77, respectively; the amplified I and Q signals thereof are input to first and second mixers 78 and 79, respectively; and the mixer outputs are sent to an adder 81. A phase lock loop (PLL) 82 is connected to first mixer 78 and is coupled to second mixer 79 through a 90 degree delay element 83. The output signal S(t) is generated at the output of adder 81. Circuit components 77-79 and 81-83 form a quadrature modulator/up-converter 66', which is an example of up-converter 66 of FIG. 4.

For instance, a GFSK modulated signal may be generated in accordance with the following equation:

$$s(t) = A \cdot \cos(2 \cdot \pi \cdot f_c \cdot t + \phi(t)) \qquad \text{(eqn. 3)}$$

$$\phi(t) = h \cdot \pi \cdot \int_{-\infty}^{t} \sum_k a_k \cdot g_{GFSK}\left(\tau - k\frac{T_b}{16}\right) d\tau$$

where, $h$ = modulation index, $A$ = amplitude, $f_c$ = carrier frequency $$a_k = \begin{cases} \pm 1, \text{ bit sequence if } \mathrm{mod}(k, 16) = 0 \\ 0 \qquad \text{else} \end{cases}$$

where the Gaussian filter core is derived as:

$$h_{Gauss}(t) = \sqrt{\frac{2\pi}{\ln(2)}} B \cdot \exp\left(-2\frac{(B \cdot \pi)^2}{\ln(2)} t^2\right),$$

where B is 3 dB bandwidth $$g_{GFSK}(t) = \qquad \text{(eqn. 4)}$$

$$g_{RECT}(t) * h_{Gauss}(t) = \frac{1}{2}\left[\mathrm{erfc}\left(\pi\sqrt{\frac{2}{\ln(2)}} \cdot B \cdot T_h \cdot \left(\frac{t}{T_h} - \frac{1}{2}\right)\right) - \right.$$

$$\left. \mathrm{erfc}\left(\pi\sqrt{\frac{2}{\ln(2)}} \cdot B \cdot T_h \cdot \left(\frac{t}{T_h} + \frac{1}{2}\right)\right)\right]$$

where, $\mathrm{erfc}(x) = \frac{2}{\sqrt{\pi}} \int_x^{\infty} \exp(-t^2) dt$ (complementary error function)

$T_b$ = bit period (symbol interval), $$g_{RECT}(t) = \begin{cases} 1, & -\frac{T_h}{2} \leq t \leq \frac{T_h}{2} \\ 0, & \text{else} \end{cases}$$

For "traditional" FSK modulation, the Gaussian filter is bypassed.

Figure 6:
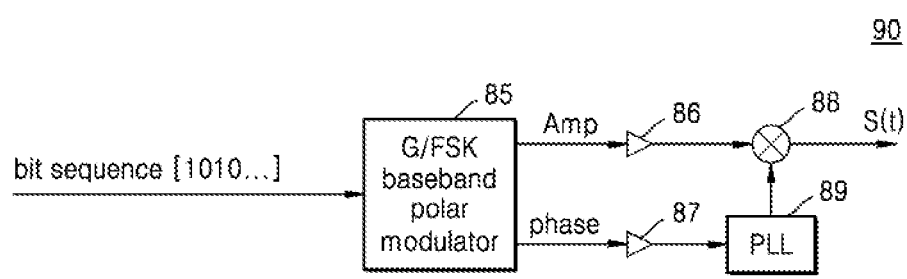
FIG. 6 is a block diagram of an example polar modulator, which may be used for the G/FSK I/Q converter and quadrature modulator/up-converter of FIG. 4.

FIG. 6 is a block diagram of an example polar modulator, which may be used for the G/FSK I/Q converter and quadrature modulator/up-converter of FIG. 4. Polar modulator 90 includes a G/FSK baseband polar modulator 85, which provides Amplitude and Phase output signals corresponding to an input bit sequence. The output signals are respectively applied to amplifiers 86 and 87, and the amplified outputs thereof are applied to a mixer 88 and a PLL 89, respectively. The output of PLL is applied as a second input to mixer 88, and the output of mixer 88 is the generated sounding signal S(t).

Figure 7:
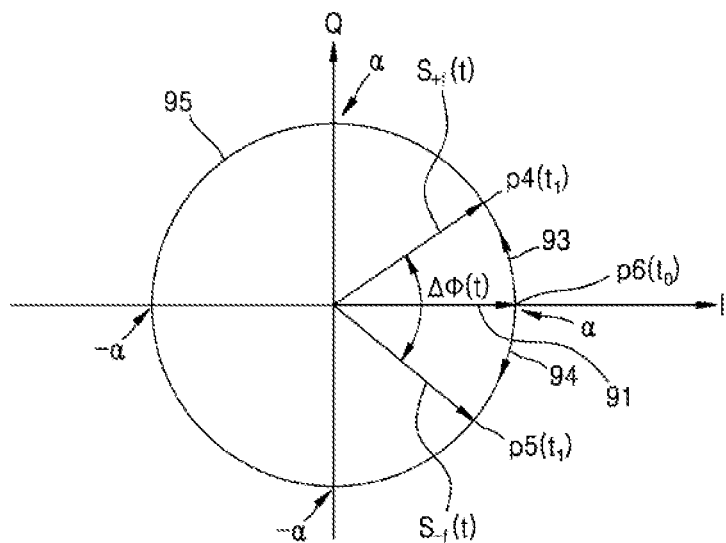
FIG. 7 is an I-Q space diagram depicting frequency components of an example sounding signal that may be generated according to an embodiment.

FIG. 7 is an I-Q space diagram depicting frequency components of an example sounding signal after being received and down-converted to baseband by wireless device 10. At baseband, the sounding signal S(t) may be approximated as the following complex sinusoids:

$$s_{+f}(t) = k e^{-j2\pi\Delta ft} \qquad \text{eqn. (5)}$$

$$s_{-f}(t) = k e^{+j2\pi\Delta ft} \qquad \text{eqn. (6)}$$

where $\Delta f$ is the frequency of the complex sinusoid (equaling the RF offset frequency) and "k" is a common complex gain of these two signals.

The phase difference between these two complex sinusoids at time instant t may be defined as:

$$\Delta\varphi(t) = \angle s_{+f}(t) - \angle s_{-f}(t) \qquad \text{eqn. (7)}$$

Then, at time instant $t_1$ the following relationship exists:

$$t_1 = \frac{\Delta\varphi(t_1)}{4\pi\Delta f} \qquad \text{eqn. (8)}$$

These relationships may be understood from the phasor diagram of FIG. 7, which illustrates examples of $s_{+f}(t)$ and $s_{-f}(t)$ in IQ space. The above expressions for $s_{+f}(t)$ and $s_{-f}(t)$ can be rewritten as follows:

$$s_{+f}(t) = k(\cos(w_B t) - j\sin(w_B t)) \qquad \text{eqn. (9)}$$

$$s_{-f}(t) = k(\cos(w_B t) + j\sin(w_B t)), \qquad \text{eqn. (10)}$$

where $w_B = 2\pi\Delta f$.

In IQ space, these two signals have values along a circle 95 of radius k. The signal $s_{-f}(t)$ is represented as a vector with magnitude k, where the vector has coordinates I=k, Q=0 at an initial time to (and thus points along the +1 axis at time to), rotates (93) counter clockwise as time t progresses, and at any time t, the vector has a polar coordinate phase denoted $\phi(t, -f)$ drawn with respect to the I axis. For example, at time $t_1$, the vector $s_{-f}(t)$ intersects the unit circle 95 at point p4. Similarly, the signal $s_{+f}(t)$ is represented as a vector with a magnitude k, where the vector has the same coordinates as $s_{-f}(t)$ at time to, rotates (94) clockwise as time t progresses, and at any time t, the vector has a polar coordinate phase denoted $\pi(t, +f)$ defined with respect to the +I axis. For example, at time $t_1$, the vector $s_{+f}(t)$ intersects the unit circle 95 at point p5. Signal $s_{-f}(t)$ may be considered as a positive frequency signal and signal $s_{+f}(t)$ may be considered as a negative frequency signal. As time t progresses, the phase angle $\Delta\phi$ between signals $s_{+f}(t)$ and $s_{-f}(t)$ progressively widens. The phase angle will wrap at $2\pi/360$ degrees, so it is necessary to combine the phase measurements with an "integer delay" from a beginning part of a packet comprising the sounding signal. Note that the instantaneous phase of these signals contains all the information needed. The DFT is executed to obtain a more accurate measurement.

With continued reference to FIGS. 4-7, the measurement of the complex gain responses $G_i(\bullet)$ and the phase relationships between them can be performed through use of sampler 67, A/D converter 74, DFT calculator 65, and CCF calculator 64. In this regard, sampler 67 may sample the baseband sounding signal S(t) to obtain a discrete signal S(n), where "n" denotes a sample number from a $0^{th}$ sample to an $L^{th}$ sample. For the $i^{th}$ measurement set $F_i$ (discussed earlier), DFT calculator 65 may determine the complex gain responses as:

$$G_i(fci - \Delta f) = \left(\left(\frac{1}{L+1}\right)\sum_{n=0}^{L} S(n) \times e^{j2\pi\Delta f n T_s}\right) \qquad \text{eqn. (11)}$$

$$G_i(fci + \Delta f) = \left(\left(\frac{1}{L+1}\right)\sum_{n=0}^{L} S(n) \times e^{-j2\pi\Delta f n T_s}\right) \qquad \text{eqn. (12)}$$

where (L+1) is the number of samples and $T_s$ is the sampling period.

It follows that:

$$\angle s_{+f}(t)=\varphi(t,+f)=\angle(\Sigma_{n=0}^{L}S(n,t)\times e^{-j2\pi\Delta fnT_s}) \quad \text{eqn. (13)}$$

$$\angle s_{-f}(t)=\varphi(t,-f)=\angle(\Sigma_{n=0}^{L}S(n,t)\times e^{+j2\pi\Delta fnT_s}) \quad \text{eqn. (14)}$$

Thus, for a given multi-tone measurement set $F_i$ with carrier frequency $f_{ci}$, the phase difference between the upper frequency ($f_{ci}+\Delta f$) and lower frequency ($f_{ci}-\Delta f$) may be determined by eqn. (7), i.e., $\Delta\varphi(t)=\angle s_{+f}(t)-\angle s_{-f}(t)$, and this relationship is carried over to the determination of phase coherence over the measurement band from $f_1$ to $f_N$.

It is noted that the measurement of $\varphi(t,-f)=\angle s_{-f}(t)$ may be made with a sampling period $T_s$ and with a correlation time satisfying $$T = \frac{M}{\Delta f},$$

where M is any integer. The correlation time T may contain a full cycle of the complex sinusoids of frequency $\pm\Delta f$ and the number of samples L may satisfy the following expression:

$$L = \frac{M}{\Delta f T_s}, \quad \text{eqn. (15)}$$

Referring again to FIG. 3B, both the first wireless device 10-1 and the second wireless device 10-2 may take time stamps for Time of Departure (ToD) and Time of Arrival (ToA) measurement times during the ranging procedure. The round trip time (RTT) can be determined as:

$$\Delta T=(ToA_1-ToD_1)-(ToD_2-ToA_2) \quad \text{(eqn. 16)}$$

where times $ToA_1$, $ToD_1$, $ToD_2$ and $ToA_2$ described above for FIGS. 2, 3A and 3B. In the measurement for ToA and ToD on the same device, the device can control the exact time of transmission, i.e., ToD, and ToA and ToD time stamping are done using the same reference clock. However, from equation (16) it is apparent that the RTT method does not rely on time stamps obtained on the two devices having the same reference clock. That is, the time difference ($ToA_1-ToD_1$) is measured using a different clock than that used to measure ($ToD_2-ToA_2$). In a typical example, the two clocks are potentially 50 ppm different and the total measurement delay is of the magnitude of hundreds of microseconds. This gives an error of magnitude of tens of nanoseconds. The methods described herein obviate these types of errors by measuring fractional delay and coherent channel frequency responses over a wide measurement band.

Figure 8:
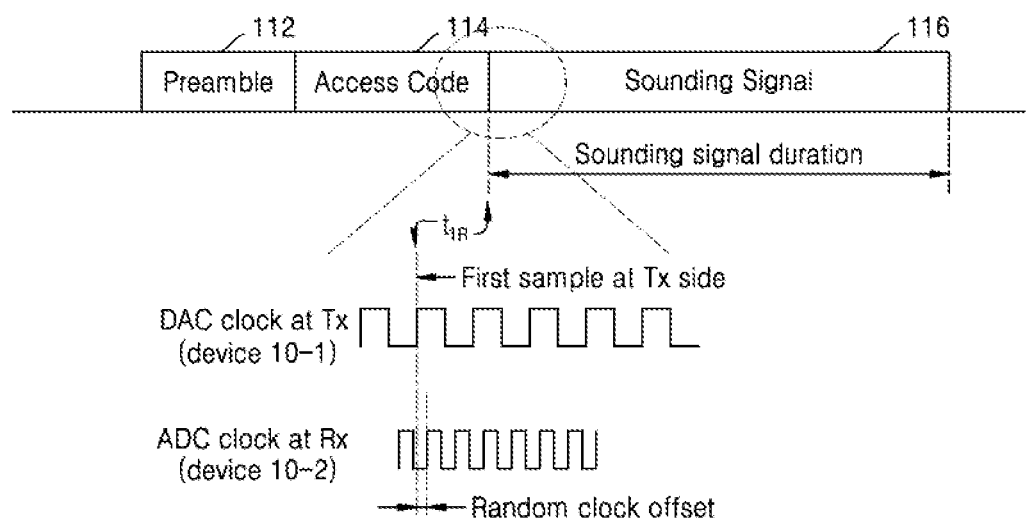
FIG. 8 illustrates an example frame structure for an RTT measurement packet and a clock timing relationship in the RTT method.

FIG. 8 illustrates an example frame structure for an RTT measurement packet and a clock timing relationship in the RTT method of FIG. 3B. For each narrowband measurement using a carrier frequency $f_{ci}$ (i=1 to N−1), a frame structure containing a preamble field 112, an access code field 114 and a sounding signal field 116 may be transmitted. Preamble field 112 and access code field 114 together constitute an example of the coarse sync sequence Y described above. A time point $t_{1R}$ between access code and sounding signal fields 114 and 116 may be designated a reference point for ToA and ToD measurements at the two wireless devices 10-1 and 10-2. (The sounding signal field 116 may correspond to the sounding signal in the transmit side frame 102 of FIG. 3B.)

FIG. 8 also illustrates that the sampling clocks on the transmitting device (e.g. a DAC clock at the first wireless device 10-1) and the receiving device (e.g. an ADC clock at the second wireless device 10-2) may have different clock speeds and thereby used for sampling at different sampling rates at the two devices. The two clocks may be unsynchronized to one other such that a random offset may exist between the two clocks. For instance, at the reference time $t_{1R}$, a first symbol interval of the sounding signal S(t) may begin at a transmit side clock edge, but a clock edge at an ADC clock of the second wireless device 10-2 may be at a short time thereafter. It is noted there that although not illustrated in FIG. 8, in some examples, the access code field 114 may be comprised of an access code sub-field, a payload header sub-field and a ranging signaling field (SFD) sub-field. The SFD sub-field may include information such as the characteristic of the ranging sequence (i.e., the sounding signal S(t) sequence). The SFD sub-field may also contain ToA and/or ToD and other associated information for time stamp feedback between the two wireless devices 10-1 and 10-2. In a Bluetooth application example, the payload header and ranging SFD may follow the access code sub-field; a cyclic redundancy check (CRC) field may follow the sounding signal field 116; and one Bluetooth packet may extend from the start of the payload header sub-field to the end of the CRC field.

Figure 10:
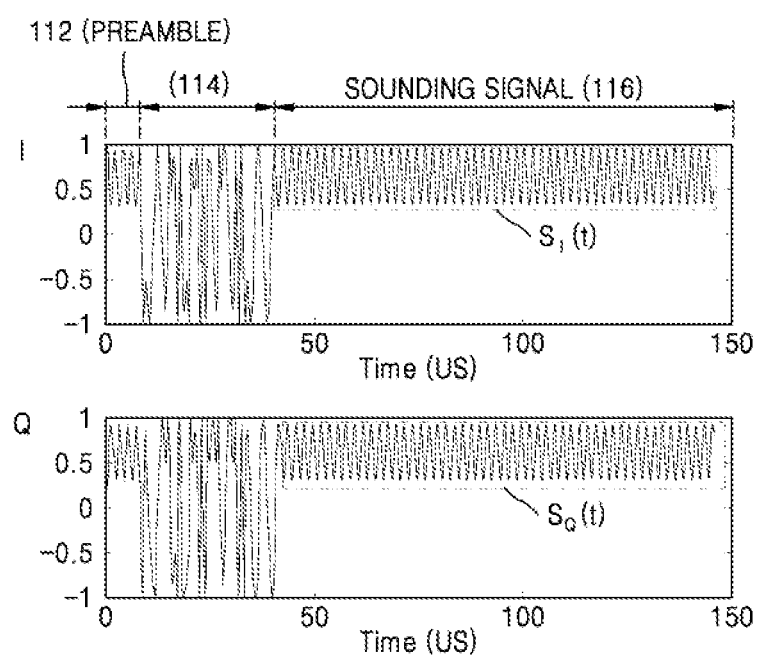
FIG. 10 depicts example I and Q components in different portions of a ranging signal that may be used in the RTT method.

Referring momentarily to FIG. 10, example I and Q components in different portions of a ranging signal that may be used in the RTT method are illustrated. In particular, the example depicts an example in-phase (I) component $S_I(t)$ and quadrature-phase (Q) component $S_Q(t)$ of the above-described GFSK modulated sounding signal S(t) (116) with a repeating [1 0] payload, along with exemplary GFSK I and Q components of a preamble portion 112 and an access code portion 114. FIG. 11 is a graph of baseband power spectral density computed for the sounding signal portion of the ranging signal of FIG. 10. The above-described positive and negative frequency components $S_{+f}$ and $S_{-f}$ (derived using DFT calculator 65 of FIG. 4) may coincide with the highest positive and negative peak spectral components of the theoretical baseband signal, respectively.

Figure 9:
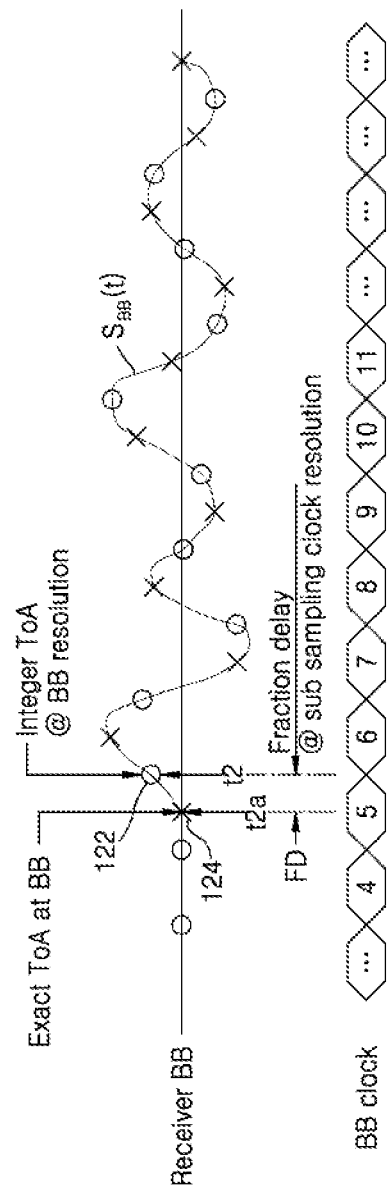
FIG. 9 is a diagram illustrating example signals and clock timing in a ToA measurement at a receiving device in the RTT method.

FIG. 9 is a diagram illustrating example signals and clock timing in a ToA measurement at a receiving device in the RTT method of FIG. 3B. The sounding signal S(t) is received at the second wireless device 10-2, down-converted to baseband and I-Q demodulated to recover baseband I and Q signals. A signal $S_{BB}(t)$ is an example of either the I signal or the Q signal of the baseband signal recovered from sounding signal S(t) (where the previously discussed signals $S_A(t)$ and $S_B(t)$ are each examples of signal S(t)). To measure ToA as described hereafter, both the I and Q signals are sampled. Signal $S_{BB}(t)$ is sampled at receiving device 10-2 at the time points denoted by circles, which coincide with successive clock transitions of a baseband (BB) clock at receiving device 10-2. In the example, a first sample 122 is taken at time t2 (the start of RTM frame 106 of FIG. 10) at a transition between clock pulses "5" and "6", and subsequent samples are taken at clock transitions thereafter. However, since the BB clock pulses began at a random time point, the time t2 occurs a random time after an actual ToA time t2a of the sounding signal. (For the purpose of this discussion, zero processing delay is assumed between the time of arrival of the RF signal S(t) and the actual recovery of the baseband signal.) Thus, a fractional delay FD=t2−t2a (equaling a time less than one BB clock cycle) exists between the time of a hypothetical sample 124 that would be taken if a receiver BB clock edge were present at time t2a, and the time point t2 of the first sample 122. The time t2a may be hereafter referred to as the "exact ToA" at baseband, and the first sample point t2 may be hereafter called the "integer ToA" or a "coarse ToA" at baseband. The series of x's in the diagram denote hypothetical sample points at the BB clock timing if the first sample was actually taken at time t2a. Since the first sample point t2 occurs after the actual ToA, a first portion of the sounding signal field 116 may not be sampled.

For a signal going through a multi-path channel, the reference time t2a of the exact ToA is the first arrival path, which is assumed to be the line of sight (LoS) path. (In some channel conditions there may not be an LoS path, whereby t2a coincides with signal arrival along the shortest path). As mentioned, because baseband sampling clock rate is limited (even assuming a very high sampling rate of 120 Msps for discussion), the exact beginning of a packet may not be sampled, and even if it is, it may be distorted by noise. In FIG. 9, based on correlating the sampled sequence (as in a synchronization process), the integer ToA can only be established at the baseband sampling clock resolution, which may not be accurate enough for a requisite ranging accuracy (e.g., +/−6.25 ns timing error resulting in around +/−1.8 m ranging error). Using the correlation processing, even if very high sampling rate is provided, the multi-path effects and the internal noise may prevent a very fine resolution measurement based on the correlation of the sampled sequence. Therefore, a fine resolution method is used in the present embodiments to estimate the fractional (sub sampling clock) delay FD and thereby provide a high resolution ToA measurement. The fine resolution fractional delay is estimated in the embodiments herein based on DFT processing described above.

For example, the sampling delay FD can be measured by exploiting the relationship of phase between complex sinusoid signals $s_{+f}(t)$ and $s_{-f}(t)$ within S(t), as previously described in connection with FIGS. 4-7. After DFT processing of S(t) at baseband, a phase difference $\Delta\phi(t2)$ may be computed, which equals the phase offset between the times t2 and t2a, and used to determine the delay FD. The phase difference $\Delta\phi(t2)$ equals the phase difference between the two complex sinusoids $s_{+f}(t)$ and $s_{-f}(t)$ at time instant t2 of FIG. 9, and may be determined as:

$$\Delta\varphi(t2) = \angle s_{+f}(t2) - \angle s_{-f}(t2) \qquad \text{eqn. (17)}$$

where $\angle s_{+f}(t)$ and $\angle S_{+f}(t)$ are determined by the above eqns. (13) and (14), respectively.

Then, at time instant $t_2$ the following relationship exists:

$$(t2 - t2a) = \frac{\Delta\varphi(t_2)}{4\pi\Delta f} \qquad \text{eqn. (18)}$$

where $\Delta f$ is the RF offset frequency as described above. Accordingly, actual ToA time point t2a, is obtained.

As noted, however, the time t2a coincides with the ToA of the line of sight (LoS) signal path, but the phase of the LoS signal may be distorted by the interference of the multi-path signals. The technique described above for obtaining the coherent channel frequency responses $H(f_1)$ to $H(f_N)$ and applying the same to the signal paths calculator 63 may then be used to correct the distorted phase and thereby obtain a corrected ToA. This corrected ToA is then used in the ranging measurement, whereby a more accurate distance between the two wireless devices 10-1 and 10-2 can be determined.

Figure 12:
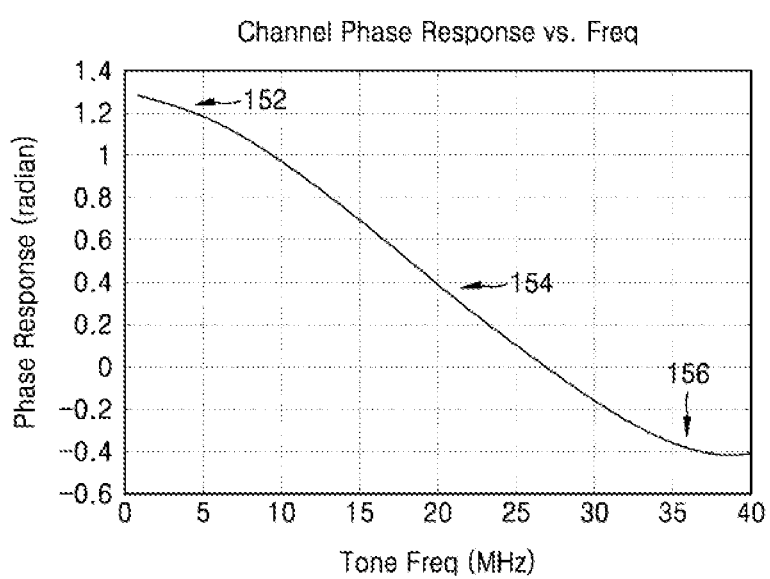
FIG. 12 is an example channel phase response vs. frequency in a multi-path environment.

FIG. 12 is a graph of an example channel phase response vs. frequency in a multi-path environment. If no multi-path were present, the channel phase response would be a linear function (as in region 154) across a generally wide measurement frequency band (e.g., 40 MHz). Due to the multi-path, however, non-linearity is present in the response as depicted by regions 152 and 156. The non-linearity shown in FIG. 12 is caused just by a single multi-path signal constructively and destructively interfering with an LoS signal. The channel phase response plots show the phase response on a set of frequencies over a two-ray channel (5 ns apart between the two rays), where a first ray is an LoS ray and a second ray is a ray along a single multi-path path.

Figure 13:
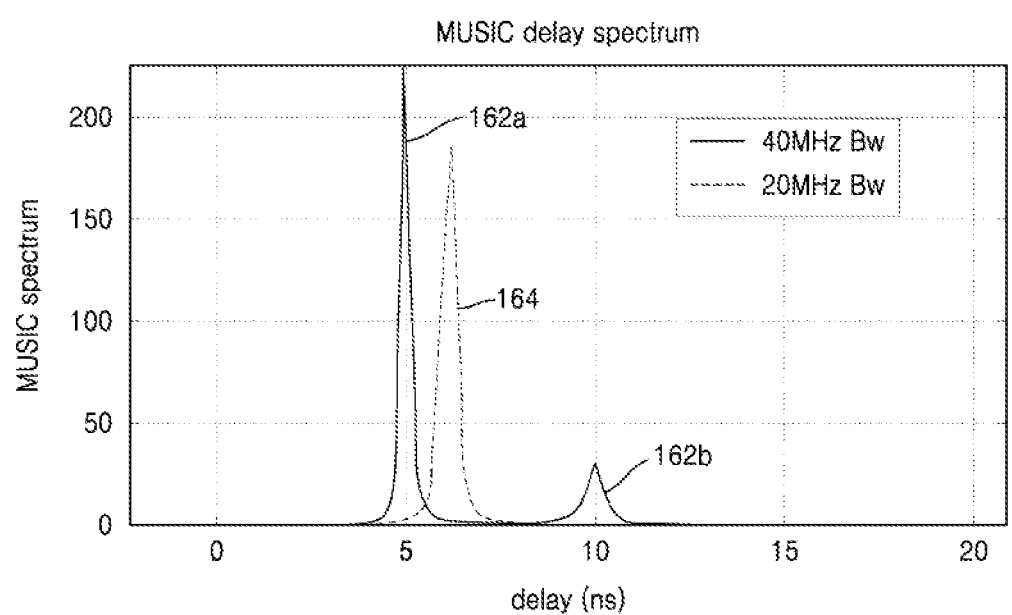
FIG. 13 shows example ToA estimation graphs computed using a signal path calculation algorithm over different measurement frequency ranges.

FIG. 13 shows example ToA estimation graphs computed using a signal path calculation algorithm (MUSIC) over different measurement frequency ranges, and coincides with the signal environment of FIG. 12. The graphs illustrate that the response should be measured over a sufficient bandwidth when the channel has multi-path. When the phase response is non-linear, this feature may not be picked up if observed in a very narrow bandwidth. The MUSIC delay spectrum shows that using a 40 MHz sounding signal (spectra 162a and 162b), it successfully resolves the two paths and will estimate the time of arrival of the first path. However, a 20 MHz bandwidth signal results in computed spectra 164 and thus cannot resolve the two paths, resulting in a ToA error.

FIG. 14 is a flow chart illustrating another embodiment of a ranging method, 1400, in accordance with the inventive concept. One prominent difference in this method from that of FIG. 2 is that instead of transmitting a sounding signal using a sequence such as $S_1, S_2, \ldots S_{N-1}$ with consecutive carrier frequencies, one carrier frequency as a time is transmitted by the first wireless device 10-1, the second wireless device 10-2 receives the signal, and then transmits back another sounding signal using the same carrier frequency, and the cycle repeats.

Accordingly, in operation S211, from the first wireless device 10-1, a first baseband signal is transmitted over an $i^{th}$ carrier frequency $f_{ic}$ (i=any integer from 1 to (N−1)) with a modulation scheme generating at least two tones associated with the $i^{th}$ carrier frequency $f_{ic}$.

At the second wireless device 10-2, the following reception and processing operations are performed (S221) using carrier frequency f c:

(1) recover baseband signal
(2) perform a coarse sync
(3) measure the complex gain response for each tone at the coarse synced time instant
(4) calculate the phase difference between the two complex gain responses
(5) record the coarse sync time and the phase difference.

From the second wireless device 10-2, a second baseband signal is then transmitted (S231) over carrier frequency $f_c$ with a modulation scheme generating at least two tones associated with carrier frequency $f_k$.

At the first wireless device 10-1, the same operations (1) to (5) of block S221 are performed (S241) with respect to the second baseband signal.

At operation S251, operations S221-S241 are repeated for each of (N−2) remaining carrier frequencies among the set $\{f_{1c}, f_{2c}, \ldots f_{(N-1)c}\}$.

From the first or second wireless device 10-1 or 10-2, the recorded coarse sync timing and the phase difference is reported to the other device (S261).

At the report receiving device, the following processing is performed (S271):

(1) correct the phase difference taking into account the coarse sync timing per each measurement over a different carrier frequency (2) align the complex gain responses for the same tone frequency measured at different carrier frequencies (3) construct a channel frequency response over the measurement band (from $f_1$ to $f_N$ produced by $f_{1c}$ to $f_{(N-1)c}$) from the corrected complex gain responses.

The channel frequency response is then applied to a signal path derivation program to obtain a time of fly (ToF) result (S281).

Time Stamping ToD and ToA for Each Sounding Frame

With method 1400, for each hopping frequency, each wireless device 10-1 or 10-2 performs transmit and receive on a scheduled time; and for both transmit and receive, the first sample of the sounding signal portion is time stamped. For the receiving case, the first sample is based on the processing result of the packet synchronisation combined with prior knowledge (indicated in a header) of the position of sounding signal in a sounding packet. For the transmit case, the modem should know when it is transmitting the first sample of the sounding signal portion. If this is not the case, the wireless device can also perform reception on its own transmission; this will make the transmit case and receive case equivalent. For this description, it is assumed that the transmit case processing is the same as the receive case.

Per each hopped frequency, two time stamps, one for ToD and one for ToA, are recorded in each wireless device 10-1 or 10-2. The time stamp of the ToD and ToA references the same continuously running system clock. For a general radio architecture, the ADC and DAC do not need to use the same clock; the system clock used for the time stamp does not need to be the same clock as ADC or DAC, nor do they need to be phase aligned.

To allow this flexibility (of selecting independent clocks for ADC, DAC and stamping), frequency response measurements are performed on both transmission and reception cases.

Measuring the Frequency Response

The time stamp only gives coarse time information due to the stamping clock resolution and the timing uncertainty (caused by the noise as well as dispersive channel) in the synchronization process. Information to improve the timing accuracy is the frequency response measured on the received sounding signal. These can be measured using the following equation, assuming carrier frequency is $f_k$, the frequency responses are measured on two frequency offsets $\mp \Delta f$ ($f_s$ is sampling rate and $\Delta f = 0.5$ MHz):

$$H(f_k - \Delta f) = \frac{1}{N}\sum_{n=0}^{N} S(n) \cdot e^{j2\pi \frac{\Delta f}{f_s} n}$$

$$H(f_k + \Delta f) = \frac{1}{N}\sum_{n=0}^{N} S(n) \cdot e^{-j2\pi \frac{\Delta f}{f_s} n}$$

This process is performed on both ToD and ToA cases in each wireless device 10,

Differential Phase Calculation

In each wireless device, per each hopped frequency, four channel responses are obtained:

$$H_d(f_k - \Delta f), H_d(f_k + \Delta f), H_a(f_k - \Delta f), H_a(f_k + \Delta f)$$

The differential phase is calculated per each hopped frequency as $$\Delta \varnothing(f_k) = \frac{1}{2\pi}(\angle H_d(f_k - \Delta f) \cdot H_d^*(f_k + \Delta f) - \angle H_a(f_k - \Delta f) \cdot H_a^*(f_k + \Delta f))$$

Note that one wireless device 10-1 or 10-2 either has ToD1 and ToA$_2$ or ToA$_1$ and ToD$_2$; the initiating device will produce $\Delta \varnothing_i(f_k)$, which is the phase difference between ToD$_1$ and ToA$_2$; and the responding device will produce $\Delta \varnothing_r(f_k)$, which is the phase difference between ToD$_2$ and ToA$_1$.

The set of $\Delta \varnothing(f_k)$ may then be quantized, for example, into 10 bits, which gives less than 1ns resolution in time assuming 1 MHz frequency step size; the values in the set of $\Delta \varnothing(f_k)$ may be sent back in the ranging report frame.

Differential Time Calculation

Per each sounding frame on a hopped frequency, two time stamps ToD and ToA are recorded; the differential time is calculated according to the following expression (note—for example, in the unit 50 ns, this is assuming the highest sampling clock 20 MHz, which is more than generous than reality).

$$\Delta T(f_k) = T_{tod}(f_k) - T_{toa}(f_k)$$

To save the bits used for encoding $\Delta T(f_k)$; an inter-packet gap $T_{gap}$, which can be made known to both wireless devices, can be subtracted from $\Delta T(f_k)$.

Due to the relative system clock error, the actual transmission time can be earlier or later than the scheduled transmit time; a constant offset can be subtracted from the $T_{gap}$ to guarantee $\Delta T(f_k) - T_{gap} > 0$. Note that from calculating the time of fly point of view, this offset is not necessary; but from a practical aspect of encoding $\Delta T(f_k)$, this will allow only non-negative coding.

Method 1400 may denote $\Delta T_{offset}(f_k) = \Delta T(f_k) - T_{gap}$ where the range of $\Delta T_{offset}(f_k)$ can be reduced to tens of microsecond. The latter example would require the encoded bits in the range of 20 bits (depending on the scheduling time uncertainty); and the set of $\Delta T_{offset}(f_k)$ may then be sent back in a ranging report frame. This will require many bits. Therefore, to reduce the feedback overhead; the following differential coding may be used:

$$\Delta T_{mean} = \frac{1}{N}\sum_{k=1}^{N} \Delta T_{offset}(f_k)$$

$$\Delta T_{diff}(f_k) = \Delta T_{offset}(f_k) - \Delta T_{mean}$$

In this regard, the $\Delta T_{diff}(f_k)$ is reduced to sync uncertainty, which is in the range of several microseconds. In an example of 5 microsecond uncertainty, this will require 8 signed bits to encode; and $\Delta T_{mean}$ would be encoded with 20 bits;

Note that if the method is not careful about choosing the $T_{gap}$, a very large report frame could result. In an example of an 80 MHz sounding bandwidth with 1 MHz step size, it takes (round-up to) 80 sounding fames; this will add up to 80×10+80×8+1×20 number of bits.

Time of Fly Channel Frequency Response Calculation

Once the ranging report frame is received, method 1400 can construct a synthetic time of fly channel frequency response. To differentiate the measurements made at the initiating wireless device and responding wireless device, superscription on the variables may be used as follows:

$$\Delta T_{mean}^i, \Delta T_{mean}^r, \Delta T_{diff}^i(f_k), \Delta T_{diff}^r(f_k), \Delta \Theta^i(f_k), \Delta \Theta^r(f_k)$$

and initiating device (e.g., 10-1) has recorded all $H_a(f_k-\Delta f)$, $H_a(f_k+\Delta f)$.

In a first processing operation, the per frequency sync jitter is calculated as follows:

$$\Delta T_j(f_k) = \Delta T_{diff}^i(f_k) - \Delta T_{diff}^r(f_k)$$

In a second processing operation, per frequency differential phase is calculated as follows:

$$\Delta \vartheta(f_k) = \Delta \Theta^i(f_k) - \Delta \Theta^r(f_k) + 2\pi 2\Delta f \cdot \Delta T_j(f_k)$$

In a third processing operation, per frequency channel frequency response is calculated as:

$$H_a(f_1-\Delta f) = H_a(f_1-\Delta f)$$

Then the following iterative calculation is performed:

$$H_{tof}(f_k-\Delta f) = H_a(f_{k-1}+\Delta f)$$

$$H_{tof}(f_k+\Delta f) = H_a(f_k-\Delta f) \cdot e^{j\Delta \vartheta(f_k)}$$

Time of Fly Estimation

At this point in method 1400, the memory 76 of wireless device 10 has recorded a set of channel frequency responses $H_{tof}(f_k-\Delta f)$, $H_{tof}(f_k+\Delta f)$, based on which a fractional time of fly can be estimated as $\delta T_{tof}$, where the final time of fly estimation is $\delta T_{tof} + \Delta T_{mean}^i - \Delta T_{mean}^r$.

The MUSIC algorithm may be used as an example of a signal path derivation program in operation S281. MUSIC may be used to estimate a delay spectrum using null space (EVD of a correlation matrix). The method may define a sample based correlation matrix $R=[r_{i,j}]_{M\times M}$, where M is the dimension of the correlation matrix with each element is expressed as:

$$r_{i,j} = \sum_{m=0}^{N-1-M} H_{tof}(m+i)H_{tof}(m+j)), \ i,j \in [0, M-1]$$

Giving that the chosen M>L, the EVD generates an orthonormal matrix $\overline{U}$, each ($k^{th}$) column vector $\overline{U}(:,k)$ is the $k^{th}$ eigen-vector corresponding to the eigen-value with descending order ($\lambda_0 \geq \lambda_1 \ldots \geq \lambda_M$). The range space of rank L can be represented by orthonormal bases $\overline{U}_{ran}=U(:,1:L)$ and null space of rank M−L can be represented by orthonormal bases $\overline{U}_{nul}=\overline{U}(:,L+1:M)$. Method 1400 may define a response vector for delay $\tau$ as $$\overline{a}(\tau) = [e^{j2\pi i 2\Delta f \tau}]_{1\times M}$$

Method 1400 may then define a delay (for delay $\tau$) spectrum as $$P_{music}(\tau) = [\overline{a}'(\tau) \cdot U_{nul} \cdot U'_{nul} \cdot \overline{a}(\tau)]^{-1}$$

Figure 15A:
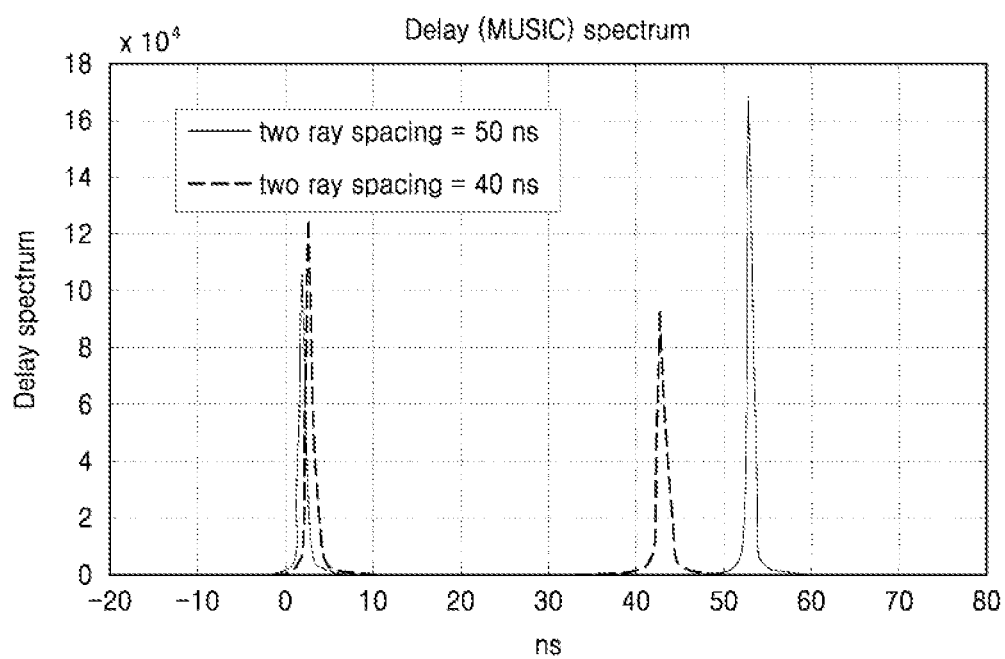
FIG. 15A is a graph of a MUSIC delay spectrum.
Figure 15B:
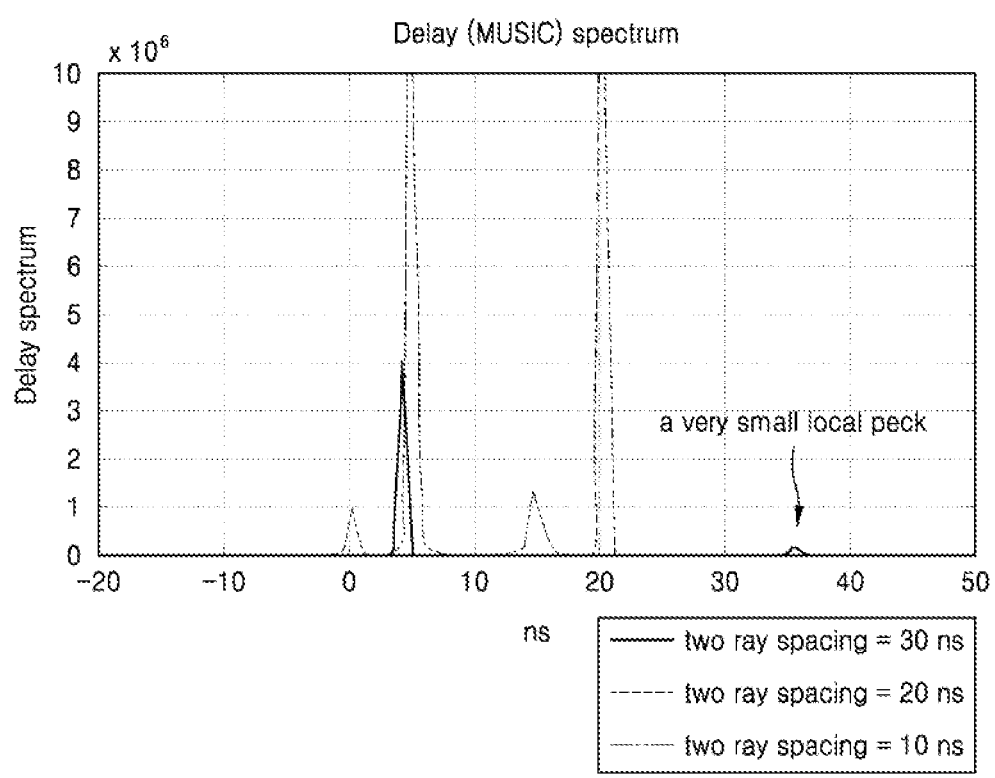
FIG. 15B is another graph of a MUSIC delay spectrum.

Method 1400 may sweep the value of $\tau$, so that a peak in this spectrum indicates an existence of a response vector of the specific value of $\tau$. The plots of FIGS. 15A and 15B illustrate a spectrum for two-ray channel with various delays (nominally 10, 20, 30, 40 and 50 ns with added random offset in the range of [0, 1] ns) between the two rays.

Angle of Arrival Measurement Method

Through various or similar operations in the methods described above, which can be used to re-construct a channel response between a pair of antennas (one at the first wireless device 10-1 and one at the second wireless device 10-2), the operations can be used to measure AoA if an antenna array is available at one of the devices (e.g., second wireless device 10-2), and signals from all the antennas can be coherently sampled. The second wireless device 10-2 can then repeat the processing to obtain the channel response over all the antennas. Now, to explain this process, the notation can be extended for complex gain response such as $G_n(f_k, i_{rx})$, which is the measured response on the $f_k$ and $i_{rx}$ antenna. Processing may be performed as described above on $\{G_n(f_k, 1)\}$. Concurrently, the phase relationship is maintained between $\{G_n(f_k, 1), G_n(f_k, 2), \ldots G_n(f_k, i_{rx})\}$. The phase difference between two antenna $i_{rx}$ and $i_{rx}-1$ may be denoted as $$\vartheta_n(f_k, i_{rx}) = \angle G_n(f_k, i_{rx}) \cdot G_n^*(f_k, i_{rx}-1), i_{rx} \in \{2 \ldots N_{rx}\}$$

After completing the processing for $\{G_n(f_k, 1)$, the AoA measurement method can perform processing $\{G_n(f_k, i_{rx})\}$ for $i_{rx} \in \{2 \ldots N_{rx}\}$, $N_{rx}$ is the total number of antenna elements. The AoA method has $H(f_k, i_{rx})$ denoting the channel frequency response at frequency $f_k$ at antenna $i_{rx}$; and has $H(f_k, 1)$. Now, per each $f_k$, the AoA method will repeat over $i_{rx} \in (2 \ldots N_{rx})$ $$H(f_k, i_{rx}) = |G_{i_{rx}-1}(f_k, i_{rx})|e^{j(\theta_0(f_k, i_{rx}-1)+\vartheta_n)},$$

where $\theta_0(f_k, i_{rx}-1)$ is the angle of $H(f_k, i_{rx}-1)$.

Ultimately, the AoA method will have a full set of $H(f_k, i_{rx})$, which allows the method to estimate the Angle of Arrival and Time of Arrival jointly per each arriving path. Based on this, angle of arrival of the LoS path can be estimated.

In another application, the AoA measurement method can be used to measure AoA and ToD if an antenna array is available at one device, e.g., the second wireless device 10-2, and two signals from two antennas (of the antenna array) can be sampled simultaneously at one time (antenna switching case). In this application, the inventive technique can be applied to the antenna domain. For each measurement over one RF channel, a complex gain response over two antennas can be measured; then sequentially, a set of two antenna measurement for all $\{f_k\}$ can be obtained as $\{G_1(f_k, 1), G_2(f_k, 2)\}$, $\{G_2(f_k, 2), G_2(f_k, 3)\}$, $\{G_3(f_k, 3), G_3(f_k, 4)\} \ldots$ The following explanation will first use the previous description to explain how a channel frequency response is obtainable on a $1^{st}$ antenna $H(f_k, 1)$ for all $\{f_k\}$; then, the following equation will be used to align the phase over a different antenna; per each frequency, the following operation per each antenna will be repeated:

$$H(f_k, i_{rx}) = |G_{i_{rx}-1}(f_k, i_{rx})|e^{j(\theta_0(f_k, i_{rx}-1)+\vartheta_n)},$$

where $\theta_0(f_k, i_{rx}-1)$ is the angle of $H(f_k, i_{rx}-1)$ and $$\vartheta_n(f_k, i_{rx}) = \angle G_n(f_k, i_{rx}) \cdot G_n^*(f_k, i_{rx}-1)$$

In another application, this AoA measurement method can be used in a device, which has multiple antennas, but only one active radio (switching antenna). The aforementioned method can be used to estimate the time of fly per each receive antenna; and based on the time of fly per each receive antenna, the angle of arrival can be estimated based on the fact that the different time of fly per each receiver antenna is due to the (known) antenna spacing and angle of arrival.

The above-described embodiments of the inventive concept may be modified in a variety of ways while maintaining the benefits stemming from the narrowband measurements. For example, the disclosed embodiments can be extended to use more than two tones to measure the channel response each time. Further, the measurement signal need not be a tone signal.

In another example, multiple sequences of measurements may be integrated to extend the measurement bandwidth. For instance, two measurements with a 40 MHz OFDM signal (e.g., an IEEE 802.11 standard OFDM PHY signal) with partial overlapping of 20 MHz allows the measurement bandwidth to extend to 80 MHz.

In yet another embodiment, instead of performing numerous frequency measurements over a series of packets (as in FIGS. 10-14) with different channel frequencies, a bespoke measurement mode can be created where the sets of tones are driven sequentially with minimal gap between them and minimal gap between transmit and receive measurements. This technique may speed up the measurement process and also be implemented with less hardware.

Moreover, an efficient implementation of the methods herein is with specific hardware to support the integer time estimate (via sync & time stamp) and fractional time estimate (via DFT). However, an alternative method is to use any RAM capture capability that may be present in the wireless device 10 to support debugging. The sync times and phases can then be extracted from the capture data. If the RAM capture is combined with a bespoke measurement mode as described above, the TX and RX signals may be captured in the same capture buffer. In this case no specific hardware support for the methodology is utilized in wireless device 10 for time stamping and time delay measurement.

Accordingly, in embodiments of the inventive concept as described above, narrowband signal/radio is used to perform ranging and/or AoA that achieves similar performance in a multi-path channel condition that traditionally is only achieved by wideband ranging technique (e.g., 40 MHz or wider). Compared to the wideband ranging techniques, the inventive concept allows for the use of narrowband radio, which is inexpensive to build and consumes less power to operate. The narrowband signal can also achieve longer link coverage compared to a wideband signal with the same total transmit power. Existing radio, such as Bluetooth radio, can be reused for the narrowband ranging application of the inventive concept.

Exemplary embodiments of the inventive concept have been described herein with reference to signal arrows, block diagrams (e.g., computing blocks of FIG. 6 or the flowchart of FIG. 3) and algorithmic expressions. Each block of the block diagrams and combinations of blocks in the block diagrams, and operations according to the algorithmic expressions can be implemented by hardware (e.g., processing circuitry of controller 60 in cooperation with memory 76) accompanied by computer program instructions. Such computer program instructions may be stored in a non-transitory computer readable medium (e.g. memory 76) that can direct a computer, other programmable data processing apparatus, or other devices to function in a particular manner, such that the instructions stored in the computer readable medium produce an article of manufacture including instructions which implement the function/act specified in the block diagram.

The term "processor" as used herein is intended to include any processing device, such as, for example, one that includes a central processing unit (CPU) and/or other processing circuitry (e.g., digital signal processor (DSP), microprocessor, etc.). Moreover, a "processor" includes computational hardware and may refer to a multi-core processor that contains multiple processing cores in a computing device. Various elements associated with a processing device may be shared by other processing devices.

The above-described methods according to the inventive concept can be implemented in hardware, firmware or via the use of software or computer code that can be stored in a recording medium such as a CD ROM, RAM, a floppy disk, a hard disk, or a magneto-optical disk or computer code downloaded over a network originally stored on a remote recording medium or a non-transitory machine readable medium and to be stored on a local recording medium, so that the methods described herein can be rendered using such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing described herein.

While the inventive concept described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. A measurement method performed at a receiving device, comprising:
   sequentially receiving a plurality of radio frequency (RF) signals, each comprising a different set of at least first and second tones at differing frequencies;
   measuring complex gain responses (CGRs) for each of the first and second tones of each of the plurality of RF signals;
   determining a phase offset between a phase of the CGR of the second tone of a first RF signal of the plurality of RF signals, and a phase of the CGR of the first tone of a second RF signal of the plurality of RF signals;
   computing a coherent channel frequency (CCF) response of the second tone of the second RF signal by adjusting a phase of the CGR of the second tone of the second RF signal by the phase offset; and
   executing, by a processor, a signal paths calculation algorithm using the CCF response of the second tone of the second RF signal to determine an angle of arrival or a time of arrival of the first RF signal in a multi-path environment.

2. The measurement method of claim 1, wherein each of the plurality of RF signals is a Gaussian Frequency Shift Keying (GFSK) signal generated using a different carrier frequency.

3. The measurement method of claim 2, wherein each GFSK signal is initiated with a data signal of a predetermined duration, composed of alternating 1's and 0's.

4. The measurement method of claim 1, wherein each of the plurality of RF signals is an orthogonal frequency division multiplexed (OFDM) signal.

5. The measurement method of claim 1, wherein the signal paths calculation algorithm is selected from the group consisting of the MUltiple Signal Classification (MUSIC) algorithm, the Estimation of Signal Parameters via Signal Rotational Techniques (ESPRIT) algorithm, and the Pisarenko Harmonic Decomposition (PHD) algorithm.

6. The measurement method of claim 1, wherein the CGRs of the first and second tones of a given RF signal of the plurality of RF signals are measured by:
downconverting the given RF signal to a baseband signal;
sampling the baseband signal to obtain a sequence of samples; and
performing a Fourier transform based processing operation on the sequence of samples, that determines amplitude and phase of a spectral component of the baseband signal at each of a positive offset frequency and a negative offset frequency relative to a reference baseband frequency;
wherein the CGR of the first tone of the given RF signal equals the amplitude and phase at the negative offset frequency and the CGR of the second tone of the given RF signal corresponds to the determined amplitude and phase at the positive offset frequency.

7. The measurement method of claim 6, wherein the Fourier transform based processing operation is a Discrete Fourier transform (DFT) operation.

8. The measurement method of claim 6, wherein the given RF signal is a Gaussian Frequency Shift Keying (GFSK) signal generated using a carrier frequency modulated to generate the first and second tones of the given RF signal at frequencies offset from the carrier frequency by the negative offset frequency and the positive offset frequency, respectively.

9. The measurement method of claim 1, wherein:
the CCF response of the second tone of the second RF signal is a third CCF response;
the complex gain response of the first tone of the first RF signal is a first CCF response;
the complex gain response of the second tone of the first RF signal is a second CCF response; and
the signal paths calculation algorithm uses the first, second and third CCF responses to determine the angle of arrival or the time of arrival of any of the plurality of RF signals.

10. The measurement method of claim 9, wherein:
the plurality of RF signals is (N−1) RF signals $S_1$ to $S_{N-1}$, where N is four or more, generated using progressively higher carrier frequencies $f_{1C}$ to $f_{(N-1)C}$, where a said RF signal $S_m$ includes one of the first tones designated as $f_m$ and one of the second tones designated as $f_{m+1}$, where m is any integer between 1 and N;
said measuring complex gain responses comprises measuring:

$$\{G_1(f_1),G_1(f_2)\},\{G_2(f_2),G_2(f_3)\}\ldots\{G_{N-1}(f_{N-1}),G_{N-1}(f_N)\},$$

where $G_m(f_m)$ is a complex gain response of a said first tone of the RF signal $S_m$, and $G_{m+1}(f_m)$ is a complex gain response of a said second tone of the RF signal $S_m$; and
the measurement method further comprises measuring a set of coherent channel frequency responses $H(f_1)$ to $H(f_N)$ according to:

$$H(f_1)=G_1(f_1),$$

$$H(f_2)=G_1(f_2),$$

$$H(f_k)=G_{k-1}(f_k)\cdot\Pi_{m=1}^{k-1}e^{j\alpha_m},\forall k=[3,N],$$

where, $$\alpha_{m+1}=\angle G_m(f_{m+1})G^*_{m+1}(f_{m+1}); \text{ and}$$

wherein the signal paths calculation algorithm uses $H(f_1)$ to $H(f_N)$ to determine the angle of arrival or the time of arrival of the first RF signal.

11. A wireless device comprising:
an antenna configured to sequentially receive a plurality of radio frequency (RF) signals, each comprising a different set of at least first and second tones at differing frequencies; and
processing circuitry configured to execute instructions for:
measuring complex gain responses (CGRs) for each of the first and second tones of each of the plurality of RF signals;
determining a phase offset between a phase of the CGR of the second tone of a first RF signal of the plurality of RF signals, and a phase of the CGR of the first tone of a second RF signal of the plurality of RF signals;
computing a coherent channel frequency (CCF) response of the second tone of the second RF signal by adjusting a phase of the CGR of the second tone of the second RF signal by the phase offset; and
executing a signal paths calculation algorithm using the CCF response of the second tone of the second RF signal to determine an angle of arrival or a time of arrival of any of the plurality of RF signals in a multi-path environment.

12. The wireless device of claim 11, wherein the CGRs of the first and second tones of a given RF signal of the plurality of RF signals are measured by:
downconverting the given RF signal to a baseband signal;
sampling the baseband signal to obtain a sequence of samples;
performing a Fourier transform based processing operation on the sequence of samples, that determines amplitude and phase of a spectral component of the baseband signal at each of a positive offset frequency and a negative offset frequency relative to a reference baseband frequency;
wherein the CGR of the first tone of the given RF signal equals the amplitude and phase at the negative offset frequency and the CGR of the second tone of the given RF signal corresponds to the determined amplitude and phase at the positive offset frequency.

13. A distance measurement system comprising:
a first wireless device comprising:
transmitting circuitry configured to sequentially transmit a plurality of radio frequency (RF) signals, each comprising a different set of at least first and second tones at differing frequencies;
a second wireless device comprising:
an antenna configured to sequentially receive the plurality of RF signals; and
processing circuitry configured to execute instructions for:

measuring complex gain responses (CGRs) for each of the first and second tones of each of the plurality of RF signals;

determining a phase offset between a phase of the CGR of the second tone of a first RF signal of the plurality of RF signals, and a phase of the CGR of the first tone of a second RF signal of the plurality of RF signals;

computing a coherent complex gain (CCF) response of the second tone of the second RF signal by adjusting a phase of the CGR of the second tone of the second RF signal by the phase offset;

executing a signal paths calculation algorithm using the CCF response of the second tone of the second RF signal to determine a time of arrival of the first RF signal in a multi-path environment; and transmitting a reporting message to the first wireless device including the determined time of arrival of the first RF signal and a time of departure of another RF signal from the second wireless device, wherein the first wireless device measures a time of arrival of said another RF signal, which is used in determining distance between the first and second wireless devices.

14. The distance measurement system of claim 13, wherein the time of arrival of the first RF signal is determined as a time of arrival of a signal component of the first RF signal in a shortest path among paths in the multi-path environment.

15. The distance measurement system of claim 13, wherein the first wireless device is configured to:

measure a time of departure of the first RF signal from the first wireless device; and compute the distance between the first and second wireless devices based on: (i) the measured time of departure of the first RF signal; (ii) the measured time of arrival of said another RF signal; (iii) the time of arrival included in the reporting message; and (iv) the time of departure included in the reporting message.

16. The distance measurement of claim 15, wherein (i) and (ii) are measured through the use of sampling using a first clock at the first wireless device, and (iii) and (iv) are measured through the use of sampling using a second clock at the second wireless device, the first and second clocks being unsynchronized to each other.

17. The distance measurement of claim 13, wherein the time of arrival of the first RF signal is based in part on a determination of a phase difference between first and second baseband signals derived from the first and second tones, respectively, of the first RF signal, the phase difference being computed using a Fourier transform based processing operation, and wherein results of said executing the signal paths calculation algorithm are used to adjust the phase difference.

18. The distance measurement of claim 13, wherein said another signal is a multi-tone RF signal having substantially the same characteristics of the first RF signal.

19. The distance measurement system of claim 13, wherein the first wireless device is configured to transmit a preamble and an access code immediately preceding each of the plurality of RF signals.

20. The distance measurement of claim 13, wherein each of the plurality of RF signals is transmitted as part of a Bluetooth packet.

* * * * *